Nov. 4, 1952 G. H. LEONARD 2,616,705

PHONOGRAPH

Filed Oct. 12, 1946 7 Sheets-Sheet 1

INVENTOR.
George Hamlin Leonard
BY
Johnson, Kline and Hensel
ATTORNEYS

PHONOGRAPH

Filed Oct. 12, 1946 7 Sheets-Sheet 2

INVENTOR.
George Hamlin Leonard
BY
Johnson, Kline and Hensel
ATTORNEYS

Nov. 4, 1952 G. H. LEONARD 2,616,705

PHONOGRAPH

Filed Oct. 12, 1946 7 Sheets-Sheet 3

INVENTOR.
George Hamlin Leonard
BY
Johnson, Kline and Hensel
ATTORNEYS

PHONOGRAPH

Filed Oct. 12, 1946 7 Sheets-Sheet 4

INVENTOR.
George Hamlin Leonard
BY
Johnson, Kline and Hensel
ATTORNEYS

Nov. 4, 1952 G. H. LEONARD 2,616,705

PHONOGRAPH

Filed Oct. 12, 1946 7 Sheets-Sheet 5

INVENTOR.
George Hamlin Leonard
BY
Johnson, Kline and Hensel
ATTORNEYS

Nov. 4, 1952 G. H. LEONARD 2,616,705

PHONOGRAPH

Filed Oct. 12, 1946 7 Sheets-Sheet 6

INVENTOR.
George Hamlin Leonard
BY
Johnson, Kline and Hensel
ATTORNEYS

Nov. 4, 1952 G. H. LEONARD 2,616,705

PHONOGRAPH

Filed Oct. 12, 1946 7 Sheets-Sheet 7

Inventor

George Hamlin Leonard

By Johnson and Kline

Attorneys

Patented Nov. 4, 1952 2,616,705

UNITED STATES PATENT OFFICE 2,616,705

PHONOGRAPH

George Hamlin Leonard, Fairfield, Conn., assignor to Arthur A. Johnson, Bridgeport, Conn., as trustee Application October 12, 1946, Serial No. 702,905

17 Claims. (Cl. 274—10)

This invention relates to an automatic record-changing phonograph of the type adapted for playing a series of disk records in succession, and particularly to improvements in automatic record-changing mechanism therefor.

In automatic record-changing phonographs heretofore known, it was customary to provide means for supporting a stack of record disks above a turntable, a mechanism for automatically releasing the records, one at a time, to deposit them or allow them to fall on the turntable, and means for moving the tone arm outward beyond record playing range after each record is played. Ordinarily the means for supporting, and releasing the records in such devices comprises support members which engage the edges of the records or portions of the records adjacent the spindle, and tend to chip or injure the records as they are handled. In some constructions records are released in such a manner as to fall at an angle upon the turntable, tending to crack or break the records when they are deposited thereon.

Devices heretofore employed for controlling the movement of the tone arm and coordinating its control with operation of the record supporting and record releasing means are extremely complicated, difficult and expensive to manufacture and assemble or repair, and are subject to damage when parts thereof are casually or deliberately manipulated during automatic operation thereof or when the mechanism is shut off.

It is an object of this invention to provide an automatic record-changing mechanism for a phonograph wherein the records are supported in a stack concentrically above the turntable, solely by means provided therefor in the spindle; and are released one by one to fall flat upon the turntable without any tendency to chip or damage any part of the record through engagement with the supporting member, or incidental to a releasing or depositing operation.

It is also an object of my invention to provide support means which maintains the stack of records in stable horizontal position parallel to the turntable, and means for supporting the rest of the stack during release of the bottom record thereof, by gripping the edge of the central aperture in the records so as to distribute the force applied thereto over a substantial surface and thus avoid any tendency to damage or chip the records as a result of the gripping action.

In connection with the foregoing objects, it is a further object to provide means for manipulating the record support means so as to permit removal of the records from the turntable after they have been played without danger of injury thereto, and so as to reset the record support means for receiving a new stack of records, incidental to placing the records on the spindle.

Still another object is to provide means associated with said record supporting and releasing means in the spindle, for selectively controlling operation of the tone arm to move the same either to shut-off position if no record is on the support means, or to move it to initial record-playing position after each record is released from the support means.

In connection with the aforesaid means for controlling the position of the tone arm, it is an object to provide means operated in accordance with the size of the record released to the turntable, for moving the tone arm to the record-playing position required by the size of the released record.

Another object of the invention is to provide mechanism as aforesaid of novel and exceedingly simplified construction.

Still another object is to provide motive power means for effecting automatic operation of the record-changing device and controlling the movement of the tone arm, preferably deriving its power from the same source as rotation of the turntable, said motive power means being intermittently operated after each record has been played to carry out a record releasing operation of the spindle as well as to move and adjust the tone arm for playing the record.

In connection with each of the various parts of the mechanism, it is an object of my invention to provide means interconnecting or coupling the various coordinated parts thereof in such a manner as to avoid damage to any part by casual or deliberate manipulation of the record changer, during its automatic operation or while it is shut off, such means preferably including frictional coupling or drive connections, permitting independent movement of the various parts, and likewise adapted to return to normal automatic operation when such manipulation ceases.

Another object is to provide manually operated means for rejecting a record deposited on the turntable at any point in the playing thereof, so that the next record in the stack will be released and played.

A further object is to provide means for moving the tone arm to shut-off position after the last record has been played and for stopping the motor or other motive power means of the record changer.

Furthermore, it is an object to provide a record-changing mechanism which can be readily mounted on the panel of a phonograph so as to be readily assembled therewith and removed therefrom and so mounted as to avoid transmission of shocks or vibration from the mechanism to other parts of the phonograph.

Further objects and advantages will appear from the following description taken in connection with the accompanying drawings, wherein Figure 1 is a perspective view of the top panel of an automatic record-changing phonograph in accordance with my invention.

A preferred embodiment of the automatic record-changing phonograph of my invention herein described and illustrated includes such conventional phonograph elements as a top panel, a horizontal turntable for receiving record disks, a motor for rotating the turntable, and a tone arm having one end mounted to permit its opposite stylus-bearing end to be raised from or lowered to record-playing position and to swing angularly inward toward the center of the turntable for playing a record, and outward beyond the periphery of records on the turntable to inoperative position.

In combination with these conventional elements, my record-changing device comprises a spindle concentric with the turntable, and mechanism associated therewith for supporting a stack of records above the turntable and for releasing the records, one by one, to drop to the turntable during successive record-changing operations. Moreover, my device comprises a tone arm control mechanism for lifting the tone arm and moving it outward to inoperative position after a record has been played or when it is desired to skip or reject a record, and for moving the tone arm to initial record-playing position after the record has been deposited on the turntable; or if the last record has been played, said mechanism moves the tone arm to an inoperative position and shuts off the phonograph. In addition, my mechanism comprises motive power means for actuating the spindle mechanism as well as the tone arm control mechanism.

Figure 1:
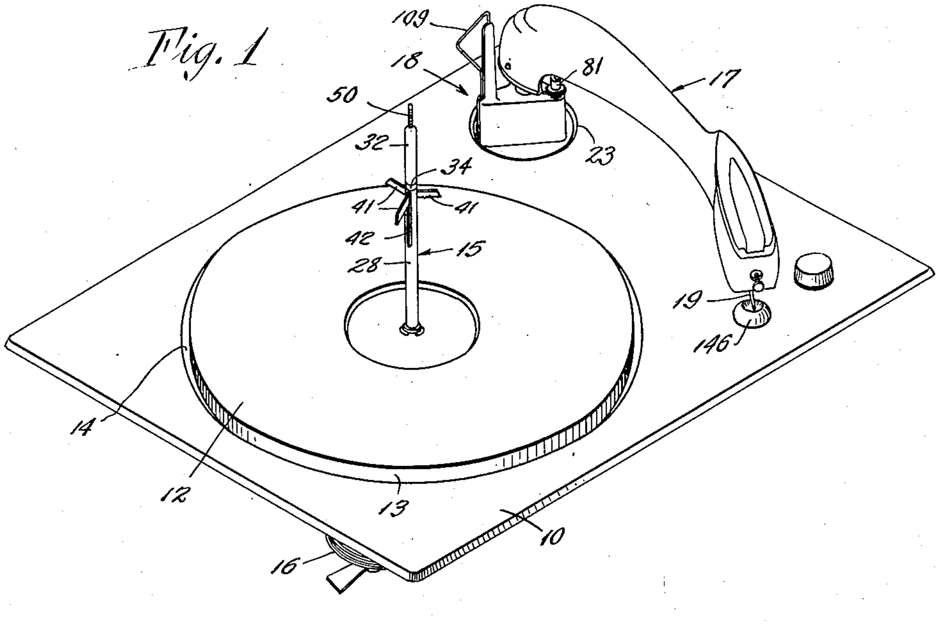
Figure 2:
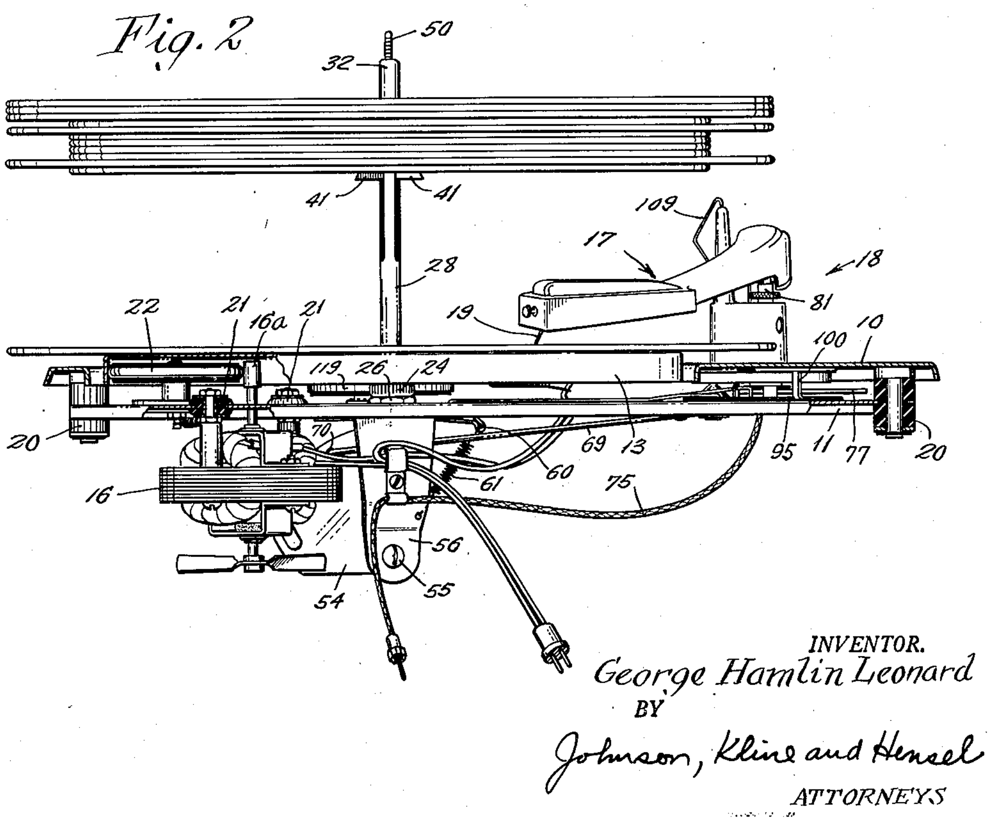
Fig. 2 is a side elevation of a device of Fig. 1.

As illustrated in Figs. 1 and 2, the record-changing device of my invention includes a panel 10 constituting the top of the framework of the phonograph; a base plate 11 which carries the various parts of the mechanism; a horizontal turntable 12, having a skirt 13 projecting downward into a large aperture 14 in the panel 10, and mounted for rotation about a central spindle 15, projecting upward from the level of the turntable; a motor 16 (preferably an electric motor) for rotating the turntable; a tone arm 17 having a pivotal mounting 18 at one side of the turntable 12 permitting the opopsite end of the tone arm which carries the stylus 19 to be raised and lowered, and also to swing angularly inward from the inoperative position shown in Fig. 1 across the turntable toward the spindle 15 for playing a record disk supported on the turntable.

The base plate 11 is fastened to the underside of the panel 10 in spaced relation therewith by means of rubber cushioned pins 20 which prevent or deaden transmission of vibrations or shock between the mechanism carried by base plate 11 and the panel or other parts of the phonograph.

The motor 16 is fastened to base plate 11, for example, by means of the rubber cushioned bolts 21 and is adapted to rotate the turntable 12 through a friction drive comprising a pulley 16*a* contacting a friction wheel 22 mounted for rotation on the base plate 11, and frictionally engaging the inside of the skirt 13 of the turntable 12, in the usual manner.

The tone arm mounting 18 is likewise supported on the base plate 11 and protrudes through an aperture 23 in panel 10. At its base, the tone arm mounting 18 is circular, fitting into aperture 23 so that the latter is substantially closed thereby when the phonograph is assembled. At the same time, aperture 23 is advantageously made large enough to permit removal of the panel 10 from the rest of the assembly by passing it over the tone arm, the turntable aperture 14 being large enough to permit removal of the panel over the spindle 15.

Figures 8, 13, 14:
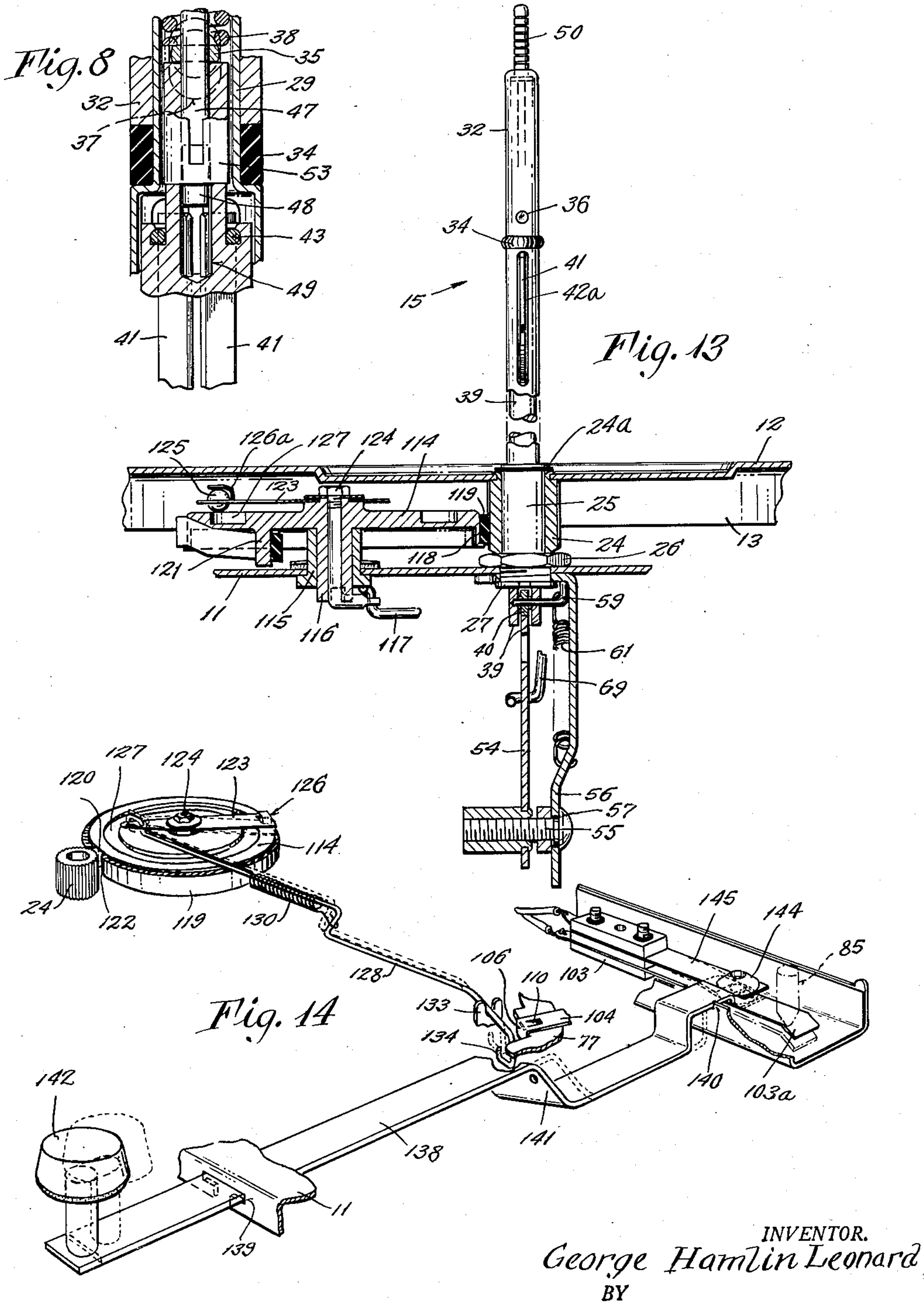
Fig. 8 is an enlarged fragmentary detail in central vertical cross-section of the releasable record support of the spindle of Figs. 5 and 6.
Fig. 13 is a detail in central vertical cross-section, along the line 13—13 in Fig. 3, of the motive power device and spindle operating means of the record-changing mechanism.
Fig. 14 is a perspective detail of the motive power device of Fig. 13 including the starting mechanism therefor, and a motor switch control cooperating therewith.

The turntable bearing, best shown in Fig. 13, comprises a vertical hub 24 attached to the turntable and fitting a tubular bearing 25 at the base of the spindle 15. The hub 24 rests on a thrust member, for example, the nut 26, which together with flange 27 secures the tubular bearing member 25 to the base plate 11. On its exterior the hub 24 is advantageously provided with a frictional drive surface as, for example, by knurling or longitudinally fluting the same. The turntable and its hub are preferably free to be lifted upward from the bearing to remove it from the spindle 15, e. g. after removal of a snap ring 24*a*.

The spindle of my record-changing device comprises a tubular stem extending upward from the tubular bearing member 25 to which the stem is secured, having a lower portion 28 of a diameter adapted to pass through the central aperture of a standard record disk, and an upper portion 29 of reduced diameter, extending upward from a shoulder 30 at the top of the lower portion 28 and terminating at an inwardly extending flange 31. A sleeve 32, terminating at its upper end in an inwardly extending flange 33, and having an outside diameter similar to that of the lower stem portion 28 fits over the upper stem portion 29 so as to move slidably thereon. Between the lower end of the sleeve 32 and the shoulder 30 at the top of the lower stem portion 28, a collar of rubber tubing 34 having an outer diameter similar to that of the exterior of the spindle, encircles the base of the reduced upper stem portion 29. A cross pin 35, extending through lateral apertures 36 in the lower end of the sleeve 32 and through vertically elongated apertures 37 in registry with apertures 36 in the walls of the reduced stem portion 29, secures the sleeve and stem together, with the elongated apertures permitting limited axial movement of the sleeve 32 relative to the stem portions 28 and 29, of such extent that when said sleeve is pushed downward on the spindle stem, it compresses the rubber collar 34, causing it to bulge resiliently outward in the manner shown in Fig. 13. The sleeve 32 is urged downward on the upper stem portion 29 by means of a relatively powerful compression spring 38 seating against the flange 31 at the top of stem portion 29, and bearing on cross pin 35, thus tending to compress the rubber collar 34. The cross-sectional proportions of the rubber collar 34 are such as to make it bulge substantially outward under such compression through the range of movement of sleeve 32 on upper stem portion 29 as limited by engagement of cross pin 35 with opposite ends of apertures 37.

Figures 5, 6, 7:
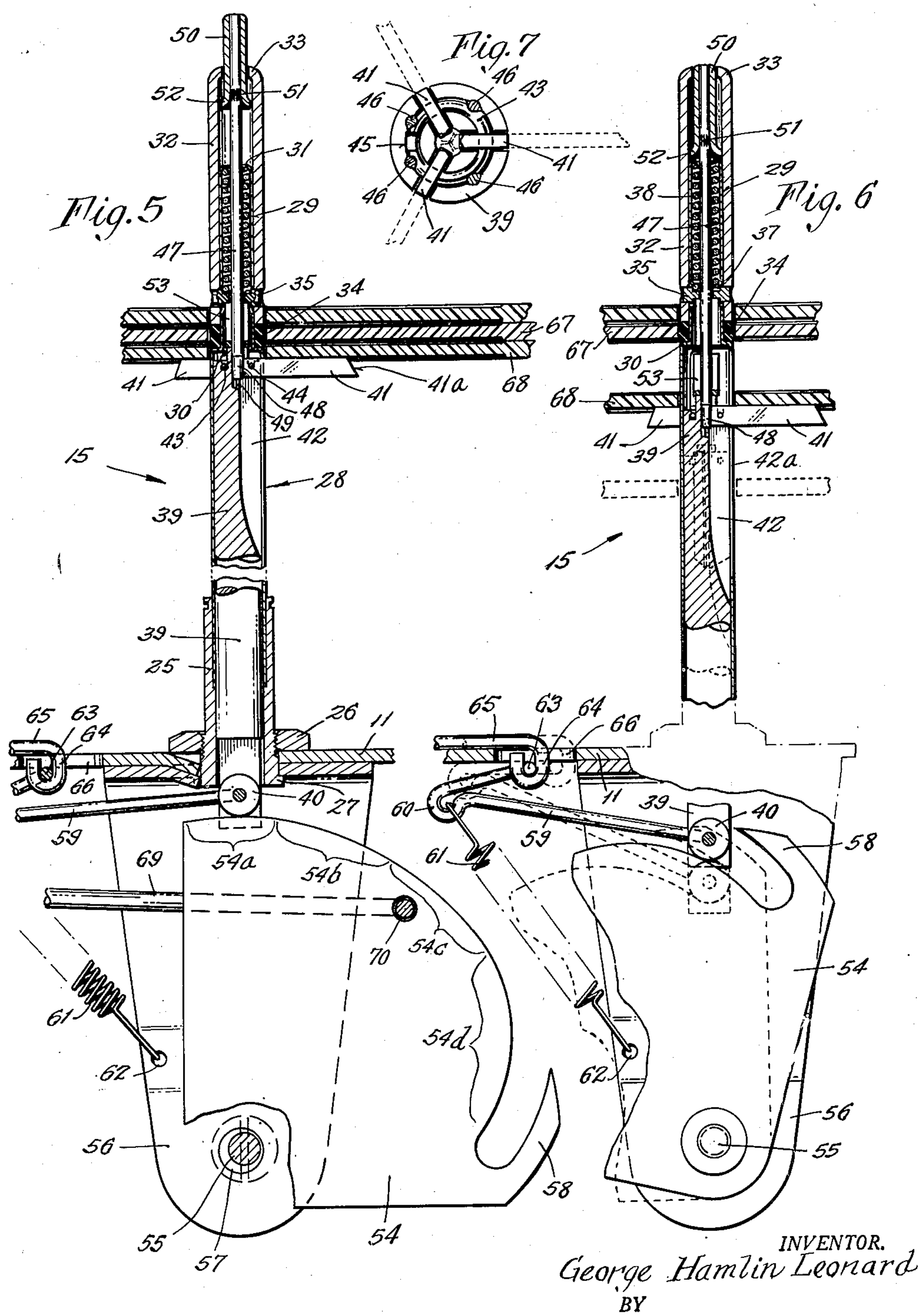
Figs. 5 and 6 are details in central vertical cross-section of the spindle of the record-changing device.
Fig. 7 is an enlarged detail in plan elevation of releasable record-supporting means in the spindle of Figs. 5 and 6.

In the interior of the spindle 15, means for operating record supporting and releasing means is provided, comprising an arm carrier or operator rod 39 fitting slidably in the bore of the lower portion 28 of the spindle stem, and extending downward through the tubular bearing member 25. The rod 39 carries a cam follower such as the roller 40 at its lower end. A plurality of record-supporting arms 41 (at least three arms), which are freely retractable by their own weight within corresponding longitudinal slots 42 in the rod 39 and slots 42$a$ in registry therewith in the walls of the lower stem portion 28, are pivotally mounted on the upper end of the rod 39 to swing outward and upward from their retracted position within the slots 42, to radially extending or horizontal record-supporting position as shown in Figs. 5 and 6. The pivotal mounting comprises, for example, a metal ring 43 passing through apertures 44 in the upper ends of the arms 41 and seating in an annular groove 45, in which it is held for example by means of staked portions 46 formed on the outer edge of the groove 45.

Means for moving the arm 41 to radially extending or horizontal position comprises, for example, a pin 47 having a cam surface 48 at its lower end adapted to slide into a central bore 49 in the upper end of rod 39, and thereby engage corresponding cam surfaces on the inner ends of arms 41 so as to move the latter to horizontally extending position and to hold them firmly therein. Upon withdrawal of the cam surface 48 of pin 47 from said bore, the arms 41 are released to permit them to fall to retracted position within the slots 42.

The pin 47 extends slidably upward through a central aperture in the cross pin 35, and thence through the center of the spring 38. At its upper end the pin 47 carries a knob or cap 50, secured to the pin, which normally protrudes through the aperture at the top of the sleeve 32. In the construction illustrated, the pin 47 is secured to the cap 50 by force fit frictional engagement at the knurled portion 51 adjacent the base of the cap. An outwardly extending flange 52 at the base of the cap 50 limits upward movement of the cap and rod 47 in the sleeve 32, while engagement of the same flange with the top of the reduced stem portion 29 limits downward movement thereof.

A collar 53 having an outside diameter permitting it to slide into the interior of the reduced stem portion 29 encircles the pin 47 adjacent its lower end and grips the same so as to permit sliding movement of the pin 47 relative to the collar, such movement being opposed, however by relatively high frictional force. The collar 53 is of such length that when the rod 39 approaches the upper limit of its movement in the lower stem portion 28 (in which its upper end is adjacent shoulder 30), the collar 53 is forced upward by rod 39 against cross pin 35, compressing the spring 38 and thus releasing the pressure on the rubber collar 34, whereupon the latter contracts to its normal diameter. At the same time, pin 47 is frictionally held by collar 53 in such position that cam surface 48 on the end of the pin enters the bore 49 in the end of the rod 39, and thus moves the arms 41 to the radially extended horizontal position shown in Figs. 5 and 6. When the rod 39 reaches the upper limit of its travel in the lower stem portion 28, and arms 41 are extended by engagement with pin 47, the flange 52 at the base of the cap 50 is below the upper limit of its movement in sleeve 32 and arms 41 can be released by manually pulling the cap 50 upward, causing the pin 47 to slide upward through collar 53 against the opposing frictional force, to remove the cam surface 48 from the bore 49. This releases arms 41 allowing them to fall into retracted position within slots 42. After such manipulation the arms 41 can be moved again to horizontal record-supporting position by applying downward pressure to the cap 50, thereby returning the cam surface 48 into bore 49 to raise the arms 41.

When the arms 41 are held in radially extended position as shown in Fig. 5, a stack of records can be placed on the spindle 15 and is stably supported by said arms in horizontal position, particularly by reason of the fact that the arms extend outward to engage the records at points relatively widely spaced from the center of the records. Records supported on the turntable 12 and trapped below the extended arms 41 can be removed from the spindle 15 after manually pulling the cap 50 upward, releasing arms 41 to fall to retracted position, and lifting the records off the spindle. The ends of the arms 41 are cut diagonally as shown at 41$a$, so that the records will cam any arm which is not fully retracted into its slot 42. To reset the arms 41 to record-supporting position, the cap 50 is pushed downward, advantageously by merely resting a stack of records to be automatically played on the top of cap 50 before the stack is impaled on the spindle.

Mechanism for raising and lowering the operating rod 39 within spindle 15 comprises a cam 54 mounted at a pivot 55 on a bracket 56 secured to the bottom of base plate 11 adjacent the base of spindle 15. Advantageously, the pivot 55 is provided with an eccentric adjustment 57 to facilitate positioning of the cam 54 over a small vertical and horizontal range of adjustment. The upper or initial dwell portion 54a (which is arcuate with respect to pivot 55) of the cam surface of cam 54 engages the cam follower 40, holding the operating rod 39 at the upper limit of its stroke, in which it compresses spring 38 to maintain the rubber collar 34 in its normal contracted condition. As the cam 54 rotates counterclockwise in Fig. 5, the adjacent cam surface 54b which inclines gradually inward toward pivot 55, allows the rod 39 to descend sufficiently to permit cross pin 35 to move downward under the compression of spring 38, compressing rubber collar 34 in the manner best shown in Fig. 13. When the next adjacent cam surface 54c rides under the cam follower as rotation of cam 54 continues to be substantially arcuate about the pivot 55, or continues to incline gradually inward toward said pivot, no further substantial downward movement of rod 39 occurs, until cam surface 54d which inclines relatively sharply inward toward the pivot 55, rides under the cam follower 40, permitting the rod 39 to descend to the lower limit of its stroke. During the final portion of the downward movement of rod 39, the cam follower 40 is positively pulled downward toward the pivot 55 by a finger 58 on cam 54, which rides over the cam follower 40. Reverse clockwise movement of the cam 54 retraces the foregoing operations, returning the rod 39 to the upper limit of its movement.

Downward movement of the rod 39 in the spindle 15 carries with it the arms 41 which are held in extended position by pin 47, together with pin 47 and cap 50 as shown in Fig. 6. However, as the cam follower 40 approaches the end of its downward travel (i. e. while in contact with cam surface 54d), further downward movement of pin 47 and cap 50 with rod 39 is arrested by engagement of flange 52 on said cap with the flange 31 on the upper end of the upper stem portion 29 of the spindle, and further downward movement of rod 39 withdraws cam surface 48 on the end of pin 47 from the bore 49 in the end of rod 39, releasing arms 41 for retraction within the slots 42, as indicated in dotted lines in Fig. 6. Reverse movement of the cam 54 moves the rod 39 upward into engagement with the end of pin 47, thus returning the arms 41 to extended position; and finally upon movement of cam surfaces 54b and 54a under the cam follower 40, the spring 38 is compressed to permit relaxation of the rubber collar 34.

Rod 39 is yieldably urged toward the upper limit of its stroke by means comprising, for example, a lever 59, advantageously made of metal wire or rod, having one end connected to the cam follower 40 and its opposite end 60 connected by a tension spring 61 to an eye 62 adjacent the lower end of the bracket 56. The lever 59 is suspended at a fulcrum 63 formed by a loop 64 in the end of a connecting rod 65 (the purpose and function of which will be later described), the fulcrum and connecting rod being slidable toward and away from the spindle 15 in a slot 66 in the base plate 11. The force applied to the lever 59 by tension spring 61 is sufficient to raise the rod 39 and its associated mechanism toward the upper limit of its movement within the spindle 15, but is insufficient to overcome the force of the spring 38 in the upper portion of the spindle. Thus, without additional force being applied, the rod 39 would maintain contact of its cam follower 40 with cam 54 solely during the movement of cam surfaces 54a and 54b under the cam follower and would remain stationary while cam 54 rotates further in counterclockwise direction, finally riding over the end of finger 58. However, under the added weight of a record disk supported on the arms 41, spring 61 yields to permit the rod 39 and its associated mechanism together with the record supported on the arms 41 to descend as cam 54 rotates counterclockwise in such a manner that cam follower 40 maintains contact with the surfaces of cam 54 until it descends to the lower limit of its stroke. When this occurs, as indicated above, arms 41 are released for retraction within the slots 42, and the record supported thereby is released to fall flat upon the turntable at the base of the spindle. Moreover, downward movement of cam follower 40 in contact with the cam surface 54d, which is insured by finger 58 riding over the cam follower 40, moves the lever 59 in the manner shown in dotted lines in Fig. 6 forcing the fulcrum 63 and hence wire rod 65 to the right in the slot 66.

In its normal condition, the spindle 15 is adapted, as shown in Fig. 5, to receive a stack of records which are supported on the extended arms 41. When a stack of records are thus supported, the record 67 which is next to the lowermost record 68 supported on arms 41, is aligned with the rubber collar 34. Record-releasing operation of the mechanism is accomplished by downward movement of rod 39 in the spindle. Initial movement of the rod releases the spring 38 to compress rubber collar 34, forcing it outward against the peripheral edge surface of the central aperture of record 67, and thus gripping this record 67 to prevent its movement on the spindle, so that it supports the overlying records in the stack. The gripping action of the collar 34 is applied in a resilient manner over a substantial edge surface of the record 67 and thus avoids all danger of chipping or damage to the record thus gripped.

Figure 16:
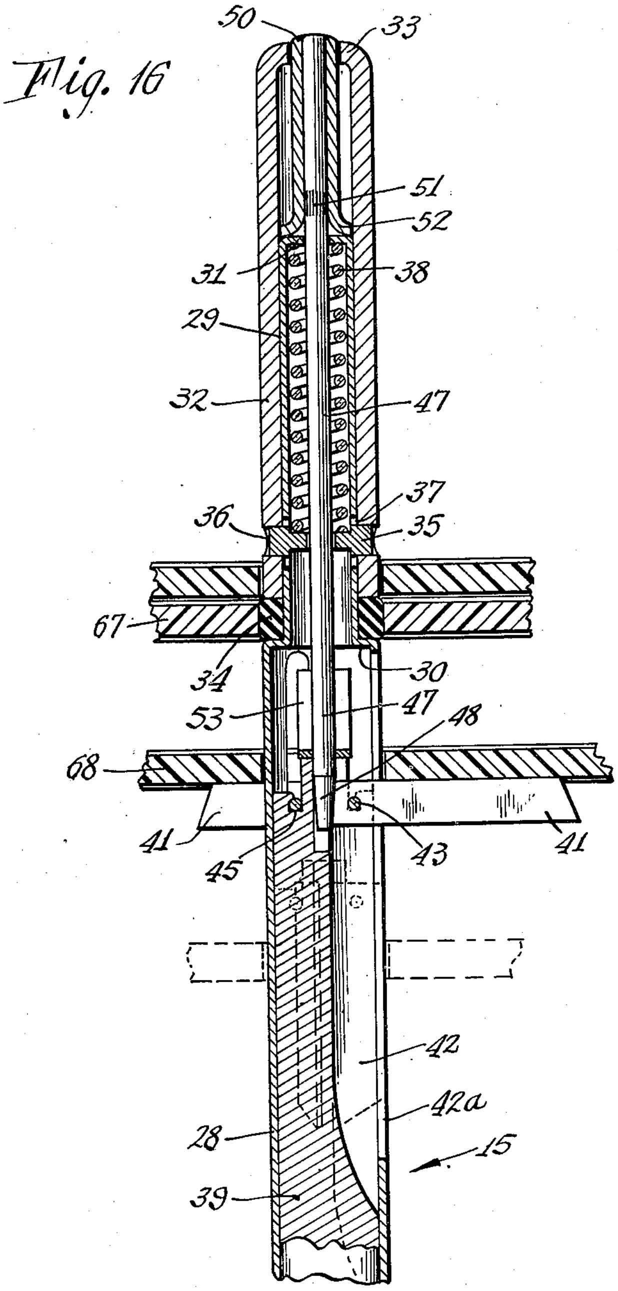
Fig. 16 is a fragmentary cross-sectional view of the upper portion of the spindle of the record-changing device, similar to Fig. 6 but drawn to a larger scale.

As rod 39, together with pin 47, cap 50 and arms 41 carrying record 68, continue their downward movement during further rotation of cam 54, movement of pin 47 is arrested and the arms 41 are released for retraction in the manner hereinbefore described, thus releasing record 68 so that it drops upon the turntable. As shown in Fig. 16, the pin 47 has completed its downward movement. Operator rod 39, however, continues its downward movement to permit the arms 41 to collapse inwardly and to release the record supported thereon to fall to the turntable. Reverse movement of cam 54 in clockwise direction shown in Fig. 5, returns the arms 41 to record-supporting position through reengagement of rod 39 with pin 47. When the collar 53 contacts the cross pin 35 and pushes it upward to release rubber collar 34 from the pressure of spring 38, record 67 and the overlying records in the stack drop upon the extended arms 41. Repetition of the operation will similarly release record 67 to fall upon the turntable while the remaining records in the stack are gripped by rubber collar 34. Since the arms 41 are uniformly released, they produce no tendency for the records to tip as they fall to the turntable; thus, any danger of injury to the records during the releasing operation is avoided.

It will be noted that minor adjustments of the position of the cam surfaces of cam 54 to adjust the position of the cam follower 40 and rod 39 can be readily effected by adjustment of the eccentric portion 57 of pivot 55.

The cam 54 is rotated back and forth through its range of travel by means of a connecting rod 69 pivotally attached to the cam at 70 and adapted to be moved back and forth by a motive power mechanism, hereinafter described.

The tone arm mounting comprises a vertical bearing sleeve 71 secured to the base plate 11 and carrying an interior sleeve 72 rotatable therein. The latter carries a bracket 73 to which a pair of pivot arms 74 are attached, and on which the tone arm 17 is mounted for pivotal raising and lowering about pivots 74*a*. The arms 74 are preferably resilient so that the pivots 74*a* can be snapped into engagement or disengaged to attach or remove the tone arm from its mounting. Sleeve 72 is held against axial displacement in sleeve 71 by brackets 73 at its upper end and a fastener such as retaining ring 72*a* at its lower end. Rotation of the sleeve 72, carrying bracket 73, in the bearing sleeve 71 permits swinging movement of the tone arm across the turntable. A conductor wire 75 connected to the pick-up device associated with the stylus 19 of the tone arm, passes downward through inner sleeve 72 to connect with the sound amplifying equipment of the phonograph.

An outer sleeve 76 fitting the outer surface of bearing sleeve 71 and rotatable thereon, carries an index and cam plate 77 on its lower end, located above the base plate 11. Moreover, the outer sleeve 76 carries a body member 78 constituting the exterior portion of the tone arm mounting, the body member being secured to the sleeve 76 for rotary movement therewith. Thus, in the illustrated embodiment, the body member 78 is secured to the sleeve 76 for rotation therewith, e. g. by means of a pin 85 projecting downward through plate 77. The body member 78 comprises a skirt 80 at its base preferably of circular shape to fit into the aperture 23 in the top panel 10 of the phonograph.

Sleeve 76 together with cam plate 77 and body member 78 are adapted to rotate about the bearing sleeve 71 and also to slide up and down thereon. At one side of the body member 78, a push rod 81, clamped in the body member by clamp screw 79, projects upward through a radial slot, preferably open at its outer end, in arm 82 on bracket 73 to contact a boss 83 on the underside of tone arm 17. The push rod is adapted to raise the tone arm from record-playing position to inoperative position about pivots 74*a* when the sleeve 76 and cam plate 77 are raised to slide upward on bearing sleeve 71. Similarly, rotation of the body member 78 with sleeve 76 causes the tone arm to swing about the bearing formed by sleeves 71 and 72, by reason of the engagement of push rod 81 with the bracket arm 82.

Means can be advantageously and conveniently provided for making minor adjustments of the limiting positions of the tone arm in its angular as well as its vertical movement, by including in the push rod 81 an eccentric portion of reduced diameter 84, said portion engaging the aperture in bracket arm 82. By rotating the push rod 81 in its mounting on the body member 78, for example, after loosening the clamp screw 79, the position of the tone arm can be adjusted angularly over a small range, and the push rod 81 held in adjusted position by again tightening the clamp screw 79. Moreover, vertical adjustment of push rod 81 on body member 78 adjusts the vertical position of the tone arm.

Horizontal angular movement of the tone arm, together with those portions of the tone arm mounting associated therewith, is limited by a pin 85 extending downward from the underside of the skirt 80 through an arcuate slot 86 in the base plate 11. The slot limits the angular movement of the pin and hence of the tone arm between its outermost position beyond the edge of the turntable, and its innermost position adjacent the spindle 15.

Means for raising and lowering the tone arm comprises a conical cam 87 movable in the track 88, and held therein, e. g. by means of a flange 89, insertable in the track through the widened portion 88*a* thereof at an end thereof. Cam 87 is movable in said track by a connecting rod 90. The track 88 is formed by a slot in the base plate 11 and comprises an outer portion 91 extending radially outward from the axis of the tone arm mounting, beyond the periphery of the cam plate 77; and a communicating inner arcuate portion 92 extending around the axis of the tone arm mounting, so as to subtend an angle somewhat greater than the maximum angular movement of the tone arm as determined by pin 85 and slot 86. Preferably, the extent of the arcuate portion 92 of the track 88 is limited, e. g. to an angle not substantially greater than 120 degrees, so that force applied substantially along the line connecting the opposite ends of track 88, can readily move the cam 87 along the full length of the track in either direction.

When cam 87 is moved inward along the radial portion 91 of the track 88 its inclined conical surface engages some point along the arcuate edge 93 of the cam plate 77 so as to raise the plate upward, lifting the tone arm 17 so that its stylus 19 is above the upper level of the topmost record of a stack carried on the turntable. The apex of the cam 87 then slides under the plate 77, and as the cam continues to move around the arcuate portion 92 of the track it rotates the plate 77 by reason of its frictional engagement therewith to move the tone arm to the limit of its outward angular movement. In order to provide a more positive engagement between the cam 87 and the plate 77, a small indentation or aperture 94 can be formed in the plate in the path of the cam, so as to form with the apex of the cam an impositive detent which carries the plate 77 along with the cam 87 until the plate reaches the limit of its movement. The cam 87 then continues its travel to the end of its arcuate path while plate 77 remains stationary. The arcuate travel of cam 87 is much greater than the angular movement of the plate 77, so that the tone arm is rapidly swung outward to the limit of its movement during the initial movement of the cam in the arcuate track. Return movement of the cam 87 in the track 88 moves the plate 77 frictionally in the opposite direction, and thus moves the tone arm angularly inward toward the spindle until its progress is arrested by index means hereinafter described. The cam 87 finally slips out from under the plate 77 when it reaches the radial portion 91 of its track, and thereby allows the plate 77 and body member 78 to move downward until the sleeve 76 abuts the base plate 11. This lowers push rod 81, thus lowering the tone arm 17 in the indexed position in which it was arrested.

Figures 9, 10, 11, 12:
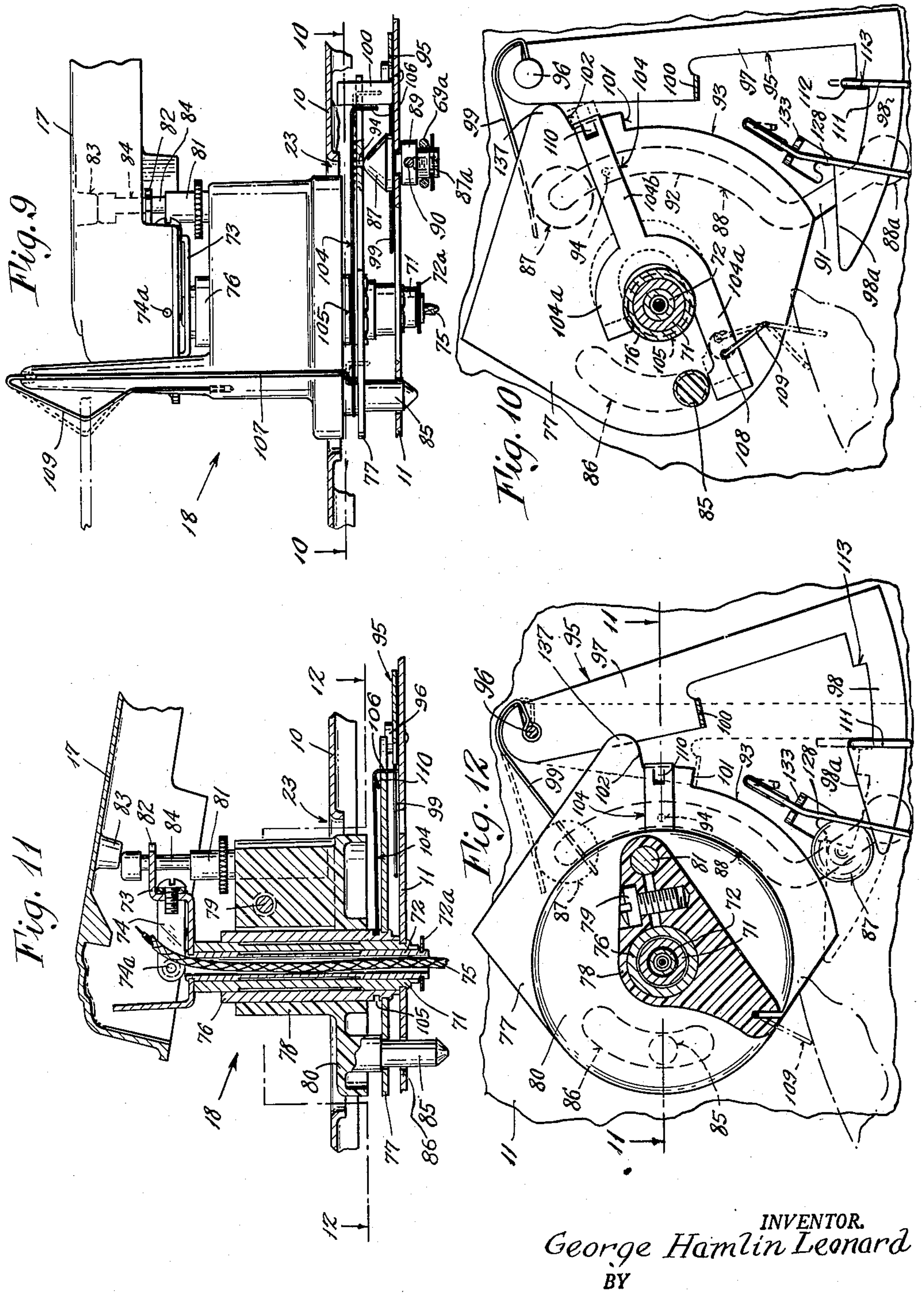
Fig. 9 is a detail in side elevation of the tone arm mounting and its operating mechanism.
Fig. 10 is a transverse section along the line 10—10 in Fig. 9.
Fig. 11 is a central vertical section of the tone arm mounting taken along the line 11—11 in Fig. 12.
Fig. 12 is a transverse section along the line 12—12 in Fig. 11.

Index means for determining the position to which the tone arm is moved upon the return stroke of cam 87 comprises an L-shaped lever 95 mounted to swing about a pivot 96 on the base plate 11, and adjacent the inner end of the arcuate portion of track 88. The L-shaped lever has an arm 97 extending radially from its pivot toward the outer or radial portion of track 88, and an arm 98 extending roughly arcuately about pivot 96 from the end of arm 97 toward the tone arm mounting 18. The end of arcuate arm 98 has a diagonal cam surface 98*a* adapted to contact the conical cam 87 when the cam moves to the outer limit of the radial portion 91 of its track 88, so that the cam can move the L-shaped lever 95 outward from the tone arm mounting about pivot 96 to an inoperative position. Adjacent the pivot 96 the L-shaped lever, or index lever 95, carries a resilient finger 99 adapted to contact the conical cam 87 when the latter reaches the inner end of arcuate portion 92 of track 88. When the cam reaches this position, it moves the finger 99 to the position shown in dotted lines in Fig. 12 thereby causing the index lever 95 to swing inward toward the tone arm mounting to an indexing position about its pivot 96.

The index lever 95 has an upwardly projecting tab 100 extending into the path of a shoulder 101 on the edge of plate 77 (as indicated by dotted lines in Fig. 12), for arresting inward rotary movement of the plate and tone arm at a shut-off or inoperative position in which the stylus 19 is beyond the periphery of a standard large-size record carried on the spindle or turntable. This position of the tone arm is referred to herein as its "shut-off position."

In order to provide for automatic control of the phonograph motor, my device includes means for shutting off the motor 16 when the tone arm is lowered in shut-off position. Thus, when the tone arm is lowered in this position, the pin 85 engages a contact member 103*a*, normally urged to circuit-closing position, in a switch 103 included in the energizing circuit for the phonograph motor 16. Upon lowering the tone arm in its shut-off position (e. g. as a result of cam 87 moving outward in the radial portion 91 of its track from below plate 77), the pin 85 depresses contact member 103*a* to open the energizing circuit of the phonograph. However, when the tone arm has moved inward from said shut-off position, or is raised, pin 85 is moved away from the contact member 103*a*, allowing the latter to reclose the motor circuit.

When the inward movement of index lever 95 is arrested in a position in which the tab 100 will clear shoulder 101, but in which it is adapted to engage a second shoulder 102 on plate 77, the tone arm is moved inward during retrograde movement of cam 87 in the arcuate portion 92 of its track, until shoulder 102 engages tab 100, whereby the tone arm is swung inward to a position above the initial playing groove or adjacent margin of a small standard size record, (for example, a 10-inch record), carried by the turntable, and as the cam 87 moves outward from beneath plate 77, the tone arm is lowered to bring the stylus upon the record in position to begin playing it.

It should be noted that the tone arm is so proportioned with respect to the relative location of its mounting and spindle 15 that a straight line connecting the stylus 19 with the axis of the tone arm mounting will form an acute angle with a radius of any standard-size record, passing through the outermost point at which the stylus 19 initially contacts the record.

By virtue of this arrangement, the frictional force applied to the tone arm by rotation of the record, has a component tending to swing the tone arm inward toward the spindle 15. Accordingly, when the tone arm is lowered, after movement to an indexed record-playing position, so that its stylus engages the smooth margin of a record rotated by the turntable, the component of frictional force acting on the stylus 19 moves the latter inward to engage the initial playing grooves of the record.

Auxiliary indexing means for arresting the tone arm in position to play a 12-inch record comprises a bifurcated tab or slide member 104, having parallel arms 104*a* which slidably engage an annular groove 105 in the outer surface of the sleeve 76, just above plate 77, and having a flat preferably resilient arm 104*b* extending across the surface of plate 77 and terminating in a downwardly bent tip 106, adapted when the member 104 is slid outward across the plate 77, to hook over the edge of said plate, intermediate shoulders 101 and 102. The member 104 is urged to retracted position so as to hold the hooked tip 106 against the edge of the plate 77 by a loop 107 of resilient wire having one end attached to the body 78 of the tone arm mounting, and its other end to an eye 108 in one of the bifurcated arms 104*a* of the auxiliary index member 104. The loop 107 has a feeler portion 109 extending inward toward the spindle 15 so as to be deflected by the outer edge of a large-size standard record, (for example, a 12-inch record), when it drops from its supported position on arms 41 to the turntable 12. When the tone arm is positioned at the outer limit of its angular movement, deflection of the feeler portion 109 of loop 107 by a 12-inch record as it falls to the turntable flexes the loop 107 so as to push the auxiliary index member 104 outward as indicated in dotted lines in Fig. 10, and a tang 110 adjacent the end of the arm 104*b* hooks over the edge of plate 77 and latches the index member 104 in its projected position. In this position, the projected end of arm 104*b* of the auxiliary index member 104 projects outward so as to mask shoulder 102 and engage tab 100, thus arresting inward angular movement of the tone arm (as the cam 87 moves backward along arcuate portion 92 of its track 88) in position to be lowered in the initial record-playing groove of the 12-inch record just deposited on the turntable. As the cam 87 moves out from below plate 77 the latter lowers the tone arm on to the record, and at the same time the tip 106 of the auxiliary indexing member 104 is flexed upward by contact with base plate 11 (or with the surface of indexing lever 95), unlatching tang 110 from the edge of plate 77, whereupon the resilient loop 107 pulls back the auxiliary indexing member 104 to its initial inoperative position with hooked tip 106 retracted against the edge of plate 77.

The feeler portion 109 of loop 107 is preferably arranged to move beyond record-engaging position when the tone arm is moved inward to shut-off position (i. e. when shoulder 101 on plate 77 engages tab 100) so that 12-inch records lying on the turntable 12 can be removed from the spindle 15 after the records have been played without deflecting the feeler 109.

In order to arrest inward movement of the index lever 95 so as to avoid engagement of tab 100 with shoulder 101 (which would arrest the inward movement of the tone arm in shut-off position) a loop 111 is provided overlying the arcuate arm 98 of the index member, and slidable in a slot 112 in the base plate 11, said loop being normally positioned to permit index lever 95 to move tab 100 inward into the path of shoulder 101 for arresting the tone arm in shut-off position. When the loop 111 is retracted in slot 112 away from pivot 96, it is adapted to engage a shoulder 113 on arcuate arm 98 of the index lever so as to arrest inward movement of the latter and position tab 100 in the path of shoulder 102 (or of auxiliary index member 104, if the latter has been latched in operative position). The loop 111 is formed in the connecting rod 65 of which loop 64 at the opposite end forms the fulcrum 63 for lever 59. When the fulcrum 63 remains in its normal position shown in Fig. 5 i. e. during an operation in which the operator rod 39 of the spindle fails to descend all the way by reason of the absence of a record on arms 41, during an operation of cam 54, loop 111 remains in its normal position, allowing index member 95 to move inward so as to bring tab 100 in the path of shoulder 101. The tone arm is thereby arrested in shut-off position and when cam 87 moves outward from beneath the plate and the tone arm is lowered, pin 85 opens switch 103 and deenergizes the phonograph to complete a shut-off operation.

However, when a record is supported on arms 41 and operating rod 39 moves downward along the cam surface of cam 54 to release the record to the turntable, lever 59 pulls the fulcrum 63 to the right (as indicated in dotted lines in Fig. 6), thereby pulling the loop 111 into the path of shoulder 113 and arresting the index lever 95 in position to bring tab 100 into the path of shoulder 102 or auxiliary index member 104. Accordingly, as cam 87 moves back along its track the tone arm is arrested in position to descend to initial record-playing position for the record just released, and release of cam plate 77 by cam 87 lowers the tone arm in this position. When the cam 87 moves outward from beneath the plate 77 as hereinbefore stated, such movement of the tone arm brings pin 85 out of range for engaging switch operator 103*a* and thereby maintains the motor circuit for operation of the phonograph, after the tone arm is lowered.

Coordinated operation of cam 54 and cam 87 is obtained by the connecting rod 69 secured to the base of cam 87 at a lost-motion connection formed for example by an elongated loop 69*a* engaging a projection 87*a* on the cam, the connecting rod 69 being movable with cam 87 along its track 88. The opposite end of the connecting rod is attached as hereinbefore stated to an eye 70 in cam 54. The initial position of cam 87 shown in Fig. 12 corresponds to the initial position of cam 54 shown in Fig. 5, in which the spindle operating rod 39 is held in uppermost record-supporting position. Inward movement of cam 87 along its track so as to raise the tone arm above record-playing position and swing it outward to the end of its angular range corresponds to rotation of cam 54 in counterclockwise direction from the position shown in Fig. 5, whereby, if a record is positioned on the arms 41, fulcrum 63 moves to the right (as shown in Fig. 6) and pulls the loop 111 to arrest the index member 95 in position to engage shoulder 102 (or auxiliary index member 104), so that upon retrograde movement of the cam 87, the tone arm will be arrested during inward movement in position to be lowered on the edge of the released record.

If the last record has already been released from arms 41, and no record remains supported thereon, such movement of cam 54 occurs without lowering of the operator 39 in the spindle 15, so that the fulcrum 63 remains in its normal position allowing index lever 95 to move to shut-off position.

Movement of index lever 95 to indexing position takes place at the end of the inward movement of cam 87 in its track 88, i. e. when it engages resilient finger 99. Such movement takes place approximately at the same time as the release of the record supported by arms 41, i. e. as cam follower 40 reaches the end of its downward movement on cam surface 54*d*. Should a large-size record be released, it engages feeler 109 so as to move auxiliary indexing member 104 to operative position. Return movement of cams 54 and 87 takes place simultaneously, cam 54 thereby resetting the spindle with arms 41 in extended position to receive the next record in the stack, while cam 87 moves the tone arm to the position determined by index member 95 and at the end of the return stroke releases the plate 77 so as to lower the tone arm in the indexed position. Finally, at the end of the return stroke of cams 54 and 87, the cam 54 raises rod 39 to release the compression exerted by spring 38 on rubber collar 34, while cam 87 moves outward in the radial portion 91 of its track, engaging the diagonal cam surface 99 of the index member 95, and moves the latter rearwardly to inoperative position. At the same time, the finger 99 swings inward across the end of track 88 for engagement with cam 87 the next time it moves inward along the track.

It will be noted that operation of the tone arm and its control mechanism is effected by a friction drive between cam 87 and plate 77, and that independent movement of the tone arm to any position thereof can be manually effected without injury of any part of the device. Moreover, the control mechanism remains in a condition to pick up the tone arm again and carry out an automatic positioning thereof during any succeeding change cycle. Regardless of the position of the tone arm, the cam 87 first moves it outward beyond the edges of any records on the spindle or turntable and before any record releasing operation occurs, so that no damage to the released record can take place.

Figure 4:
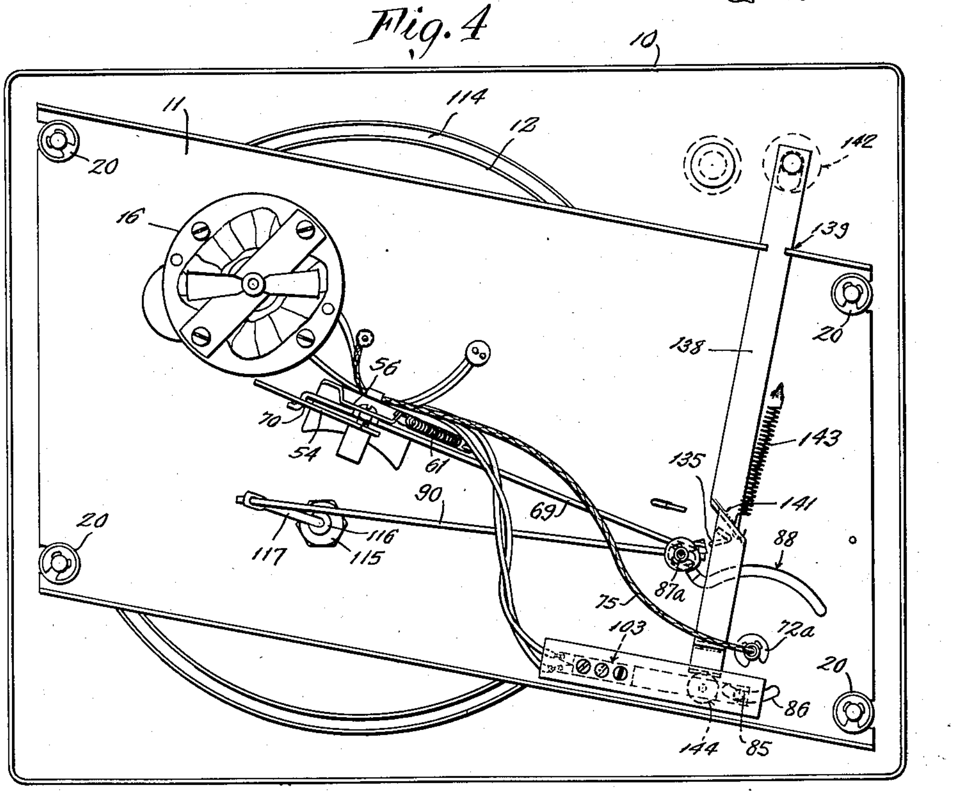
Fig. 4 is a bottom elevation of the mechanism of Fig. 3.

Operation of the spindle mechanism for releasing the records one by one, and coordinating operation of the tone arm control mechanism, as hereinbefore described, is effected by a common motive power device, preferably deriving its power from the same source as the turntable. As illustrated in the embodiment of the invention shown in the drawings, the motive power device comprises a disk 114 rotatably mounted on the top of the base plate 11 at a bearing 115, having a hub 116 carrying a crank 117 projecting through the bearing to the lower side of the turntable 11. The crank 117 is attached by the connecting rod 90, hereinbefore mentioned, to the base of cam 87, which in turn is connected to cam 54 by the connecting rod 69. When crank 117 has moved a short distance beyond its dead center position in which it is doubled upon the connecting rod 90, as shown in Fig. 4, and cam 87 has moved inward a short distance from the outer limit of its travel to its initial position adjacent the outer end of the radial portion 91 of its track 88, cam 54 which controls the spindle mechanism remains in its final or initial record-supporting position, effectively decoupled from disk 114 by reason of the lost motion connection 69*a* of connecting rod 69 to cam 87. When the crank 117 has moved to said position beyond dead center, disk 114 is relieved of any working load tending to retard its further rotation. Rotation of disk 114 through a half revolution from this starting position moves the crank toward its opposite dead center position to cause cam 87 to move inward to the inner end of arcuate portion 92 of its track 88, and simultaneously moves cam 54 to the limit of its counterclockwise rotation from the position shown in Fig. 5. Completion of the revolution of the disk 114 returns crank 117 to its original position somewhat beyond dead center shown in Fig. 4, returning cams 54 and 87 to their initial positions, shown in Figs. 5 and 12. Thus, each rotation of the disk 114 is adapted to effect a complete change cycle (i. e. a record-releasing operation if a record is supported on the spindle, or if no record is supported on the arms 41 of the spindle 15, a shut-off operation).

Means for rotating the disk 114 preferably comprises a frictional coupling between the disk and a movable portion of the turntable-rotating mechanism; and for the purpose of causing the disk 114 to stop after each revolution, a driven friction coupling surface is interrupted, so that when the interrupted portion reaches the driving surface, no further torque is applied to the disk. Thus, in the construction shown in the drawings, particularly Figs. 13 and 14, the disk 114 has a peripheral skirt 118 carrying a band 119 of friction material such as rubber. The disk 114 is mounted so as to bring the band 119 into contact with the friction surface of the bearing hub 24 of turntable 12, so that rotation of the latter can cause the disk 114 to rotate by frictional engagement with the band 119. In order to provide for minor adjustment of the position of disk 114 relative to the hub 24, the bearing 115 is advantageously made eccentric relative to its mounting on base plate 11, so that on rotating the bearing 115, the disk 114 can be moved a slight distance inward or outward from hub 24, the bearing 115 being secured in the adjusted position.

In order to provide for interrupted rotation of the disk 114 after each revolution thereof, namely, at the end of each record-changing operation, the peripheral surface of the band 119 is interrupted for a short interval, for example, by drawing the band 119 inward through an opening 120 in the skirt 118 and threading it around a projection 121 spaced inward from the periphery of the disk 114. This forms an interruption or interval 122 in the surface of the band 119, so that when the interval reaches the friction surface of the hub 24 of the turntable, frictional coupling of the latter with the disk 114 is interrupted, and rotation of the disk stops. The stopping position of the disk 114 corresponds to positioning of the crank 117 adjacent and beyond its dead center, shown in Fig. 4, at which time cams 54 and 87 are in their initial positions indicated in Figs. 5 and 12.

Means for initiating rotation of the disk 114 after it has reached its uncoupled position comprises a tripping mechanism, including an arm 123 overlying a disk 114 and mounted for rotary movement about a pivot 124 concentric with the bearing of disk 114. At the outer end of arm 123 means is provided for frictionally engaging the disk 114 so that slight rotary movement of the arm about its pivot in counterclockwise direction in Fig. 3, moves disk 114 to bring the interval 122 in its peripheral band 119 beyond the turntable hub surface 24. Band 119 thus engages hub 24 and a revolution of the disk is initiated. Should the arm 123 move in the opposite direction and tend to carry disk 114 with it, rotation of the disk will not be initiated since clockwise rotation of the disk brings band 119 on the other side of interval 122 into contact with the surface of hub 24, so that rotation of the latter merely returns the disk to its stopping position.

Figure 3:
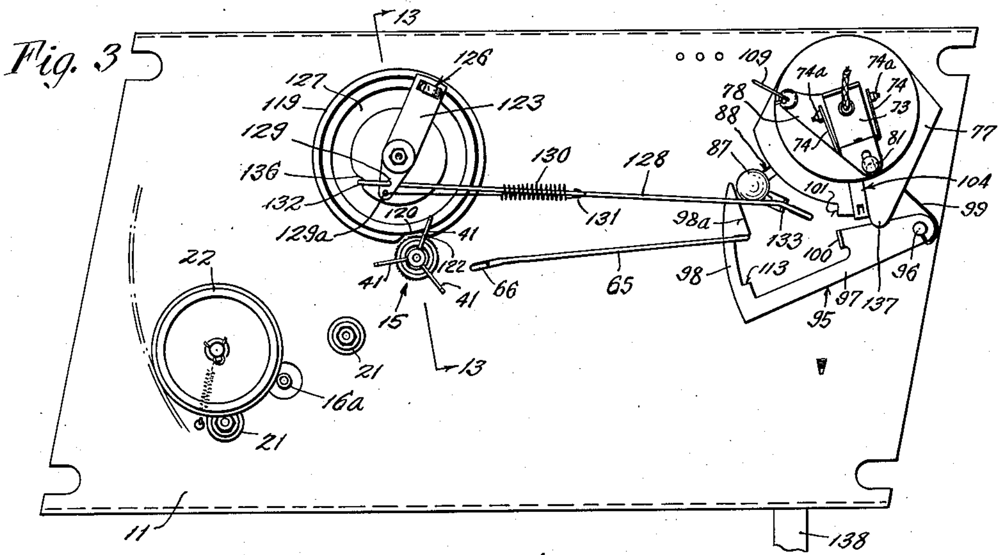
Fig. 3 is a plan elevation of the mechanism of the device of Fig. 1, with portions thereof including the panel and turntable removed to show underlying parts of the mechanism.

Means for frictional engagement between arm 123 and disk 114 comprises for example, a metal ball 125 carried in pocket 126 formed by a lanced-out portion of the metal adjacent the end of arm 123, having a wedge surface 126*a* which tends to wedge the ball against the marginal face of disk 114, e. g. beyond the outer rim of an annular channel 127 in the upper surface of the disk 114, when arm 123 moves in counterclockwise direction (in Fig. 3). Clamping of the ball 125 between said marginal portion of disk 114 and surface 126*a* provides frictional engagement so that rotary movement of the arm 123 in said direction about its pivot tends to rotate disk 114 in the same direction. By virtue of the wedge action of surface 126*a*, movement of the arm 123 in the opposite direction releases the ball so that the arm is freely movable without frictional engagement with disk 114.

Mechanism for moving the arm in counterclockwise direction (referring to Fig. 3) comprises a trip lever 128, best shown in Figs. 3 and 14, attached to the arm 123 at an eye 129 adjacent one end, and spaced from the pivotal mounting 124 of the arm 123; and a tension spring 130 having one end connected to a point 131 on the lever 128 and its other end connected to an eye 129*a* on arm 123, radially spaced from the eye 129. The lever 128 projects beyond eye 129 and terminates in a hook 132 extending downward into the annular channel 127 on the disk 114. The opposite end of lever 128 extends through a guide 133 carried on the top surface of the base plate 11, and includes a portion extending beyond the guide and terminating in a dependent hook 134 which extends downward through a slot 135 in the base plate 11. The tension of the spring 130 tends to move arm 123 in counterclockwise direction in Fig. 3, causing corresponding counterclockwise rotation of the disk 114 so as to initiate a revolution thereof by engaging band 119 with the surface of turntable hub 24. Such movement of the lever 128 is prevented however by engagement of hook 132 with the inner rim of channel 127. Moreover, a notch 136 is advantageously provided on the inner rim of said channel so that hook 132 enters the notch when the disk 114 is positioned with the interrupted interval 122 in band 119 adjacent turntable hub 24, so that when the disk 114 completes each revolution, entry of hook 132 into notch 136 prevents such overtravel of the disk as would reengage band 119 with the rotating hub 24, and effect a second revolution of the disk 114.

When the end of lever 128 extending through guide 133 is pushed toward disk 114, the hook 132 is dislodged from the notch 136 and rides outward across the lower surface of the annular channel 127, moving arm 123 in clockwise direction and slightly stretching spring 130. As explained above, clockwise movement of the arm 123 is ineffective to cause rotation of disk 114. However, when the pressure on the end of lever 128 is released, spring 130 pulls the lever to the right in Fig. 3, and at the same time rotates arm 123 a short distance in counterclockwise direction, causing corresponding rotation of the disk 114 by reason of its frictional engagement with arm 123 through the ball 125. The resulting engagement of band 119 with the surface of turntable hub 24 continues rotation of the disk 114 through one revolution, arm 123 moving sufficiently therewith to bring hook 132 against the inner rim of channel 127, and interval 122 in the band 119 again interrupting the rotation when it reaches the bearing hub 24, whereupon hook 132 again enters the notch 136 on the inner rim of the channel 127. The resulting rotation of the disk 114 effects a change cycle, i. e. a record-changing or shut-off cycle, involving operation of the spindle record-releasing mechanism and coordinated operation of the tone arm.

My record-changing device is also provided with manual as well as automatic means for initiating the rotation of the disk 114 to start a change cycle. Automatic means for initiating such rotation comprises a nose 137 on plate 77, which, as hereinbefore indicated, rotates through the same angle as the tone arm 17. The hook 134 on the end of trip lever 128 extends into the path of the nose 137, so that when the stylus 19 of the tone arm reaches the final playing grooves and lead-in spiral of a record, its inward movement toward the spindle causes the nose 137 to engage the hook 134 and push the lever 128 to the left (in Fig. 3), against the tension of spring 130. As the stylus 19 continues to move inward along the lead-in spiral of the record grooves, it finally reaches the eccentric groove which causes the tone arm 17 to oscillate inward and outward with respect to the spindle. Upon the first retrograde movement of the tone arm away from the spindle, nose 137 releases the end of lever 128 and permits spring 130 to draw lever 128 to the right, with corresponding counterclockwise rotation of arm 123, thus initiating a counterclockwise revolution of the disk 114. In the course of the resulting change cycle the tone arm is first raised, then moved outward, returning the nose 137 to a position out of range for engaging the hook 134 on the guided end of lever 128, and allowing the hook 132 at the opposite end of the lever 128 to return to the inner rim of the channel 127 and finally to reengage notch 136 when one revolution of the disk 114 is complete.

Manual means for initiating rotation of the disk 114 while motor 16 and turntable 12 are rotating comprises a bar 138 extending across the lower surface of the guide plate 11, carried in a guide slot 139 formed in the edge of the base plate 11 and likewise carried in a guide slot 140 adjacent the motor switch 103. The bar 138 includes a cam surface 141 adapted to engage hook 134 on the guided end of trip lever 128 and push it to the left in Fig. 3, when the bar 138 is manually pushed inward toward the switch 103 by means of a knob 142 projecting upward from one end of the bar 138 through a slot in the top panel 10 of the phonograph. The knob 142 is removable to permit removal of the mechanism from panel 10. The bar 138 is normally urged to retracted position by means of tension spring 143. When the knob 142 is pushed inward, the cam surface 141 engages the hook 134 on the guided end of lever 128, pushing the latter so as to move arm 123 in clockwise direction. Upon releasing the knob 142, the bar 138 springs back under the influence of spring 143, while the lever 128 is pulled back by spring 130, moving arm 123 in counterclockwise direction, and initiating a revolution of the disk 114. Such manipulation of the knob thus initiates a change cycle in the same manner as automatic operation of lever 128 by the nose 137 on plate 77.

If a record is supported on the arms 41 of the spindle at the beginning of the change cycle, it is deposited upon the turntable, and the tone arm is moved to record-playing position. If no record is supported on the arms 41, the rotation of the disk 114 in response to manipulation of knob 142 effects a shut-off operation as hereinbefore described. Thus, whenever it is desired to reject or interrupt the playing of a record which has been deposited on the turntable, and to release the next record supported on the arms 41, or to shut-off the phonograph if the record being played is the last one in the stack, such operation is initiated merely by pushing knob 142 inward and releasing it.

Moreover, means is provided for starting the phonograph at any time, e. g. when a new stack of records is placed on the supporting arms 41 of the spindle 15, if tone arm 17 is in a shut-off position. This means comprises a cam 144 on a second contact member 145 of switch 103, which is engaged by the inner end of bar 138. When the latter is pushed inward by manipulation of knob 142, engagement of the end of rod 138 with the cam 144 depresses contact member 145 so as to close the circuit of motor 16 through switch 103 and start rotation of the turntable 12. Temporary closure of the switch 103 by means of the contactor 145 occurs regardless of the fact that the other contactor 103*a* is depressed to open circuit position by the pin 85, resulting from the positioning of the tone arm in shut-off position. Release of the knob 142 effects engagement of the frictional drive surface of disk 114 with the hub 24 of the turntable so that the latter which is rotated by the motor 16 rotates the disk 114 sufficiently to move the tone arm 17 upward, thus causing pin 85 to release contactor 103*a*, which continues to maintain the circuit to the motor 16 after the knob 142 is released. Thus, manipulation of the knob 142 not only starts rotation of the motor 16 and turntable 12, but at the same time initiates a change cycle involving record-releasing operation of the spindle 15 and a positioning operation of the tone arm control mechanism, whereby the tone arm is placed on the released record in record-playing position.

If a record remains on the turntable when the phonograph is shut-off, and it is desired to play this record, it is merely necessary to lift the tone arm by hand and place it in record-playing position, thereby causing pin 85 to release switch member 103*a*, thus starting the turntable motor 16. No operation of the disk 114 in the associated record-changing mechanism occurs until the record has been played and a change cycle initiated by the tone arm, or until the knob 142 is manipulated to reject the record.

On the other hand, if it is desired to stop the phonograph at any time, the tone arm is merely lifted by hand from the record and moved to shut-off position in which pin 85 opens the motor circuit by engaging switch member 103*a*.

A cup 146 may be advantageously provided, removably mounted in an aperture in the panel 10, into which the stylus 19 extends when the tone arm 17 is moved to shut-off position. This cup holds the tone arm against wide swinging when the phonograph is moved or carried. The cup is best made of cushioning material such as rubber to prevent damage to the stylus, and can be made with a deep well to receive used needles to be discarded.

Figure 15:
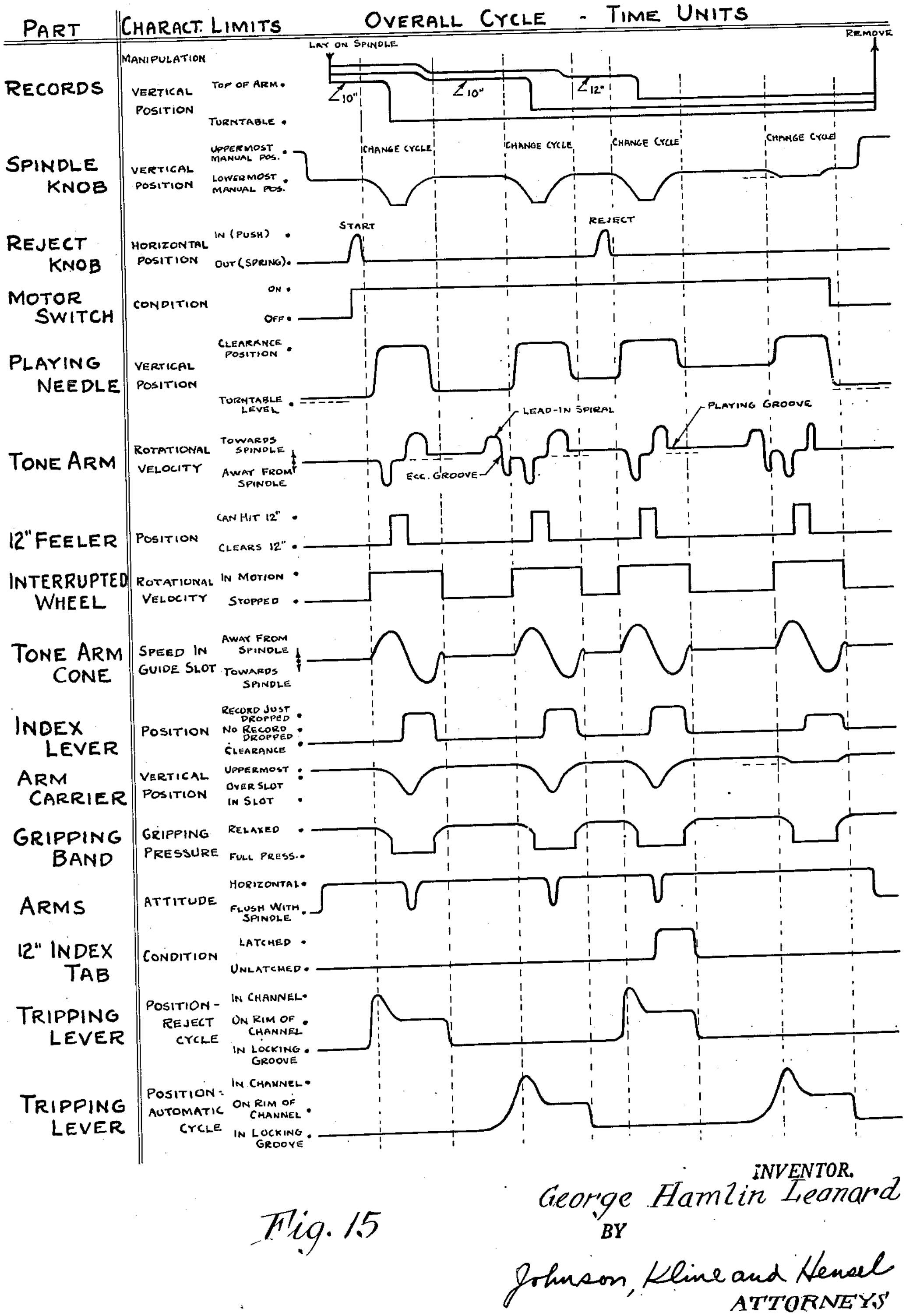
Fig. 15 is a chart showing successive operations, coordinated in point of time, of various parts of my device during successive record-playing, changing, and rejecting operations, and a shut-off operation.

Fig. 15 is a chart in which time is plotted along horizontal coordinates, and simultaneous positions or velocities of the various parts of the mechanism are plotted on vertical coordinates in a succession of graphs.

Opposite the first legend: "Records," in the chart, positions of three records, on the supporting arms 41 of the spindle 15 and on the turntable 12, are shown from the time they are placed upon the spindle to the time they are removed from the turntable, through a succession of four change cycles and three intermediate record-playing cycles. The first three change cycles are record-changing cycles, and the last is a shut-off cycle. Initially the stack of three records (comprising two 10'' records and one 12'' record) are placed upon the supporting arms 41. During the first change cycle, the lowermost record is released to the turntable and the other two records come to rest on the arms 41, where they remain during the succeeding record-playing operation. During the second change cycle, the second 10'' record falls to the turntable on top of the first record, and the third record is lowered to rest on the arms 41. During the third change cycle, the 12'' record is deposited upon the other records on the turntable, and the three records remain on the turntable until they are removed after the final change cycle.

Opposite the second legend, "Spindle Knob," is shown the position of the knob or cap 50 at the top of the spindle 15. The cap is initially in manually raised position whereby the record-supporting arms 41 were lowered or retracted within the spindle, e. g. for removal of records previously played from the turntable. Before placing the three records on the spindle, the cap 50 is manually depressed to its lower manual position (shown in Fig. 5), raising the arms 41 to record-supporting position. This manipulation of the spindle knob or cap 50 is conveniently effected merely by resting the three records on the top of the knob before they are placed on the spindle. During the first three change cycles, in each of which a record is supported on the arms 41, the cap 50 descends to its lowermost position wherein the arms 41 are retracted to release the record resting thereon to the turntable. During the last change cycle, cap 50 descends only slightly, together with operating rod 39 since the latter is prevented from descending all the way by the counterbalancing force of tension spring 61 acting through lever 59. Hence, the cap descends only the small distance effected by the compression spring 33 operating to compress rubber collar 34 on the spindle. Finally, after completion of the last change cycle, the cap 50 is manually raised to release arms 41 to retracted position, so that the stack of records can be removed by lifting them over the spindle from the turntable.

Opposite the third legend, "Reject Knob," is indicated the position of knob 142. The latter is pushed inward, and then returned to its initial position by spring 143, to start the phonograph and to initiate the first change cycle. It is again operated in the same manner to interrupt playing of the second record after it has been deposited on the turntable, to start a change cycle during which the third record is released for playing.

Opposite the next legend, "Motor Switch," is plotted the "on" or "off" condition of the switch 103 in the circuit of the turntable motor 16. The switch is initially closed by pushing in the Reject Knob 142 and remains closed until the end of the last change cycle.

Opposite the next legend, "Playing Needle," is shown the vertical position of the stylus-carrying end of the tone arm 17. Initially, the latter is in its lowered inoperative position, in which the stylus just clears the surface of the turntable, such clearance being adjusted by vertical setting of the push rod 81. During each record-changing cycle it is raised for initial outward movement away from the spindle, and then inward to a record-playing position in which it is again lowered. During the last change cycle, the stylus of the tone arm is similarly moved but is finally lowered to an inoperative or shut-off position beyond the periphery of the records on the turntable.

Opposite the next legend, "Tone Arm," is plotted the angular velocity of the tone arm 17 toward and away from the spindle 15. The tone arm is initially in "shut-off" position, beyond the periphery of the turntable. During the first change cycle, it is moved first outward away from the turntable, then inward to record-playing position in which it is lowered upon the record which has been released to the turntable. At the end of the ensuing record-playing operation, engagement of the stylus with the grooves of the record carries the arm slowly inward and then at a faster rate along the lead-in spiral. As the stylus engages the eccentric grooves in the record, it moves outward a short distance, such movement initiating the next change cycle. During the second change cycle the tone arm is again moved outward to the limit of its angular motion then inward to record-playing position in which it begins to play the second record. However, in response to operation of the reject knob 142, indicated above, and before the second record has been played to the end, a change cycle is manually initiated, and movement of the tone arm occurs in the same manner as in the preceding change cycle. When the tone arm has played the third record, engagement with the lead-in spiral and the eccentric groove causes it to initiate the last change cycle, during which the tone arm is moved outward to the limit of its angular motion, as before, and then inward to shut-off position, just beyond the periphery of the records on the turntable, thus returning to its initial position.

Opposite the legend, "12'' Feeler," is shown the position of the loop 109 which moves into range of the edge of a 12'' record as it drops from the supporting arms 41 to the turntable 12 during each change cycle. The loop is moved out of range of the 12'' record when the tone arm moves inward to (or beyond) shut-off position.

The next legend, "Interrupted Wheel," refers to operation of disk 114 which constitutes the motive power device for the record-changing mechanism. As shown by the plotted line, this disk is rotated throughout each change cycle, and is at rest at other times, each change cycle corresponding to one revolution of the disk.

Opposite the next legend, "Tone Arm Cone," is shown the velocity of the conical cam 87 along its track 88. As shown in Fig. 4, track 88 extends away from the spindle 15 so that movement of cam 87 is first away from and then toward the spindle, during each change cycle. The cam moves inward along its track to the limit thereof (i. e. away from the spindle during the first half of the change cycle) and then returns to its initial position in the track (during the second half of the change cycle).

The position of the index lever 95 is shown opposite the next legend, said lever moving inward to a position for arresting the tone arm in a record-playing position (if a record is supported on arms 41) as conical cam 87 reaches the inner end of its travel along track 88, while during the last change cycle, it is similarly moved inward to a position for arresting the tone arm in shut-off position (by reason of the fact that no record is carried by arms 41). At the end of each change cycle, the lever 95 is moved outward to its initial inoperative position by engagement of the cam 87 with the cam surface 99 on the end of the index lever.

Opposite the legend, "Arm Carrier," is shown the position of the operator rod 39 of the spindle 15, said rod descending during the first three change cycles to the limit of its downward movement by reason of the weight of the record carried on arms 41. During the last change cycle, it descends only a small distance under the influence of spring 38, further movement being prevented by the counterbalancing effect of tension spring 61, in the absence of a record supported on the arms 41.

The next legend, "Gripping Band," refers to the condition of the rubber collar 34 which is adapted to grip the central aperture of the record above the one supported on arms 41. During each change cycle, this collar is compressed during the initial downward movement of the arm carrier or operating rod 39 to retain all but the bottom record of the stack in supported position on the spindle, and then relaxed during the final upward movement of said operating rod adjacent the end of each change cycle.

Opposite the legend "Arms," is shown the condition of the arms 41 on the spindle. Initially, they are lowered or retracted by reason of the fact that cap 50 is in manually raised position. Before the records are placed on the spindle, the arms are moved to extended record-supporting position by manipulation of the spindle knob referred to above. During the first three change cycles they are momentarily lowered when the arm carrier or operating rod 39 reaches the lowest portion of its downward movement, so as to release the record supported thereby to drop upon the turntable. Initial upward movement of the arm carrier or operating rod 39 resets the arms to record-supporting position, and final upward movement of the rod releases the gripping band or rubber collar 34 to permit the rest of the stack to rest upon the arms. During the final change cycle, the arms 41 are not released since they support no record and accordingly, rod 39 does not descend to the lower limit of its stroke. After the end of the last change (or shut-off) cycle the arms are manually lowered by raising the spindle knob 50 to permit removal of the records from the turntable.

The legend "12'' Tab," refers to the position of the auxiliary index member 104. The latter normally remains in unlatched or retracted inoperative position with its tip 106 against the edge of plate 77. During the third change cycle, in which a 12'' record drops from the arms 41 to the turntable 12, the 12'' feeler, upon contact with the edge of the record, moves the auxiliary index member 104 outward to operative position in which it is latched by engagement of tang 110 with the edge of plate 77. It remains in latched position during inward movement of the tone arm, so as to arrest the tone arm in initial record-playing position for the 12'' record. Thereafter, when plate 77 is released by cam 87, the stylus-carrying end of the tone arm is lowered to record-playing position. Contact of the tip 106 with the underlying surface (of plate 11 or index lever 95) unlatches the tang 110 from the edge of plate 77 and the member 104 returns to inoperative position.

Opposite the next two legends, both referring to the position of the "Tripping Lever," i. e. the lever 128, is shown the position of the hook 132 on the end of said lever with reference to the channel 127, and the locking groove or notch 136. Thus, initially, the hooked end 132 of said lever is moved outward from the notch 136 across the channel 127 in response to manipulation of the reject knob 142 to start the phonograph. Upon releasing the knob, the end of lever 128 moves toward the inner rim of the channel under the influence of spring 130, and at the same time rotates disk 114 through the frictional engagement of arm 123 to start the change cycle. During the change cycle, the hooked end of the lever rests against the inner rim of channel 127 until it again engages the notch 136 as the interrupted portion 122 of the periphery of disk 114 again reaches the rotating hub 24 of the turntable, and rotation of the disk 114 ceases. A similar operation occurs in response to manipulation of the reject knob 142 during the playing of the second record, to initiate the succeeding change cycle.

In the second line bearing the legend "Tripping Lever," is shown the position of the hooked end 132 of the lever 128 during automatic operation. In this case the lever 128 is moved so as to push the hooked end 132 outward across channel 127 by engagement of its opposite end with nose 137 on plate 77, as the stylus-bearing end of the tone arm 17 is carried inward, during the latter part of the record-playing interval, along the last playing grooves of a record, and along the lead-in spiral. Initial outward movement of the tone arm when its stylus enters the eccentric groove of the record causes nose 137 to release the end of lever 128, allowing spring 130 to retract the lever, and initiate rotation of the disk 114, thereby starting the succeeding change cycle. In the first case the change cycle thus initiated is a record-changing cycle, and in the second case, a shut-off cycle.

It will be noted that relatively few parts are required in the device of my invention to perform the complicated operations required for changing records, shutting off the phonograph, and coordinating operation of the tone arm during record-changing operation. The parts of the device are of simple construction, easily manufactured, assembled or dismantled for replacement or repair.

All of the interconnected parts of the mechanism are coupled by friction drives which permit independent manipulation of various parts of the mechanism without damage to any of the parts thereof, and in such a manner as to permit automatic operation to be resumed regardless of the position to which any of the parts may have been moved by deliberate or casual manipulation.

Changes can be made in various parts of the mechanism without departing from the scope of the invention. Those parts which perform dual functions can be replaced by separate members, and the power for operating the record-changing mechanism can be derived from a separate motor other than that for rotating the turntable.

Variations and modifications may be made within the scope of this invention and portions of the improvements may be used without others.

I claim:

1. In a phonograph having a horizontal turntable for receiving record disks, a spindle projecting upward from the level of the turntable and concentric therewith to receive a stack of record disks; an exposed annulus of rubber-like material on said spindle; said annulus being expansible to grip the peripheral surface of the central aperture of a record disk to hold said record disks in position on the spindle and contractible to release said disks; means for supporting a record disk above the level of the turntable comprising a plurality of arms pivoting within the spindle and rotatably movable about their pivots between outwardly extending record-supporting position adjacent said annulus with the sides of the arms receiving and supporting the disks released by the annulus when the annulus is contracted, and downwardly collapsed record-releasing position within the spindle wherein the sides of the arms are out of engagement with the disk to deposit the lowermost disk on the turntable after the annulus has been expanded to grip the next disk in the stack whereby the distance the lowermost disk drops to the turntable is reduced to a minimum; means to expand the annulus to grip the peripheral surface of the central aperture of the next disk in the stack; and operating means within the spindle for moving said arms between record-supporting and record-releasing position.

2. In a phonograph having a horizontal turntable for receiving record disks, a spindle projecting upward from the level of the turntable and concentric therewith; an exposed annulus of rubber-like material on said spindle; said annulus being expansible to grip the peripheral surface of the central aperture of a record disk to hold said record disk on the spindle and contractible to release said disk; an axially movable operator within said spindle; a plurality of arms pivotally mounted on said operator and rotatably movable between outwardly extending record-supporting position and downwardly collapsed record-releasing position within the spindle, said plurality of arms being capable of being moved to a record-supporting position subjacent said annulus to receive the disks released by the annulus when contracted, said arms then being capable of being moved downwardly to a record-releasing position and being collapsed to deposit the lowermost disk on the turntable after the annulus has been expanded to grip the disk superjacent the lowermost disk being deposited, whereby the distance the lowermost disk drops to the turntable is reduced to a minimum; means to expand the annulus to grip the peripheral surface of the central aperture of the disk superjacent the lowermost disk; and means within the spindle for moving said arms to record-supporting position in response to predetermined movement of said operator in one direction in the spindle, and releasing said arms for movement to record-releasing position upon movement of said operator in the opposite direction of said spindle.

3. In a phonograph having a horizontal turntable for receiving record disks, a spindle projecting upward from the level of the turntable and concentric therewith; an exposed annulus of rubber-like material on said spindle; said annulus being expansible to grip the peripheral surface of the central aperture of a record disk to hold said record disk on the spindle and contractibe to release said disk; an axially movable operator within said spindle; a plurality of arms pivotally mounted on said operator and rotatably movable between radially extending record-supporting position and downwardly collapsed record-releasing position within the spindle, said plurality of arms being capable of being moved to a record-supporting position subjacent said annulus to receive the disks released by the annulus when contracted, said arms then being capable of being moved downwardly to a record-releasing position and being collapsed to deposit the lowermost disk on the turntable after the annulus has been expanded to grip the disk superjacent the lowermost disk being deposited, whereby the distance the lowermost disk drops to the turntable is reduced to a minimum; means to expand the annulus to grip the peripheral surface of the central aperture of the disk superjacent the lowermost disk; means within the spindle for moving said arms to record-supporting position in response to predetermined movement of said operator in one direction in the spindle, and releasing said arms for movement to record-releasing position upon movement of said operator in the opposite direction of said spindle; and manually adjustable means for rendering the last-named means inoperative to move said arms to record-supporting position.

4. In a phonograph having a horizontal turntable for receiving record disks, a spindle projecting upward from the level of the turntable and concentric therewith; an exposed annulus of rubber-like material on said spindle; said annulus being expansible to grip the peripheral surface of the central aperture of a record disk to hold said record disk on the spindle and contractible to release said disk; an axially movable operator within said spindle; a plurality of arms pivotally mounted on said operator and rotatably movable about their pivots between radially extending position for supporting a record disk on the spindle and downwardly collapsed record-releasing position within the spindle, said plurality of arms being capable of being moved to a record-supporting position subjacent said annulus to receive the disks released by the annulus when contracted, said arms then being capable of being moved downwardly to a record-releasing position and being collapsed to deposit the lowermost disk on the turntable after the annulus has been expanded to grip the disk superjacent the lowermost disk being deposited, whereby the distance the lowermost disk drops to the turntable is reduced to a minimum; means to expand the annulus to grip the peripheral surface of the central aperture of the disk superjacent the lowermost disk; and a cam within said spindle for moving said arms to extended position upon predetermined upward movement of said operator in the spindle, said cam releasing said arms for movement to record-releasing position upon downward movement of said operator in the spindle, said cam being manually adjustable to render the same inoperative to move said arms to record-supporting position.

5. In a phonograph having a horizontal turntable for receiving record disks, a spindle for supporting a stack of record disks above a turntable and for releasing said record disks, one at a time, to deposit the same upon said turntable, said spindle including a plurality of arms pivotally mounted in the spindle for rotational movement between radially extending record-supporting position in which the sides of the arms engage and support the disk and downwardly collapsed record-releasing position within the spindle wherein the sides of the arms are moved out of supporting engagement with the disk to deposit the lowermost disk on the turntable; an exposed annulus of rubber-like material on said spindle above and adjacent to said arms for gripping the peripheral surface of the aperture in a record disk overlying a disk supported on said arms, said plurality of arms receiving the disks released by the annulus when contracted; and means in said spindle operating on said arms and annulus for successively expanding said annulus to holding position, collapsing said arms to deposit a record disk supported thereby on the turntable, returning said arms to record-supporting position, and contracting said annulus to record disk-releasing condition.

6. In a phonograph having a horizontal turntable for receiving record disks, a spindle for supporting a stack of record disks above a turntable and for releasing said record disks, one at a time, to deposit the same upon said turntable, said spindle including an operator axially movable in the spindle; a plurality of arms pivotally mounted on said operator for movement between radially extending record-supporting position and downwardly collapsed record-releasing position within the spindle; an external annulus of rubber-like material on said spindle adjacent and above said arms; means within the spindle normally compressing said annulus to grip the peripheral surface of the aperture of a record disk adjacent and above a disk supported by said arms when the latter are extended; and means within said spindle for successively moving said arms to record-supporting extended position and for releasing the compression of said annulus to release the record held thereby upon a predetermined upward movement of said operator in the spindle, said means successively compressing said annulus, and releasing said arms for collapse thereof to deposit the disk supported thereby on the turntable upon predetermined movement of said operator in a downward direction within the spindle.

7. In a phonograph having a horizontal turntable for receiving record disks, a spindle having means thereon for supporting a stack of records and releasing said records, one at a time, to deposit the same on a turntable; an axially movable operator within said spindle for effecting said record-releasing operation; a cam follower on the lower end of said operator; cam means comprising two distinct surfaces alternately cooperating with said cam follower, cooperation with the follower with one of said cam surfaces initiating a shut-off operation and with the other of said cam surfaces initiating a record-playing operation; and means counterbalancing said operator and said support means to cause said cam follower to cooperate with the first of said cam surfaces, said counterbalancing means being overbalanced by the weight of a record on said supporting means to cause said cam follower to cooperate with the other cam surface during a record-releasing operation of said operator.

8. In an automatic record changer having a horizontal turntable for receiving record disks, a central spindle projecting upward from the level of the turntable, and a tone arm pivotally mounted for movement toward and away from the spindle and movable between raised record-disengaging and lowered record-playing position; mechanism for raising and lowering said tone arm and for moving it inward toward the spindle and outward therefrom while raised, comprising a plate mounted for pivotal movement about an axis perpendicular to the plate, and movable in axial direction along the pivot axis; means operably connecting said plate to the tone arm for moving the latter about its pivot upon rotation of the plate and for raising and lowering the tone arm upon axial movement of the plate; cam means comprising a track having a portion extending radially from the plate and a communicating inner arcuate portion co-axial with the plate; a cam movable along said track and means for moving said cam inward and outward along the radial and arcuate portions of said track during a record-changing cycle; inward and outward movement of the cam in said radial portion of the track moving the plate in axial direction, respectively to raise and lower the tone arm, and movement of the cam along the arcuate portion of the track toward and away from said radial portion moving the plate in opposite directions about its axis to move the tone arm respectively outward and inward about its pivot.

9. In an automatic record changer having a horizontal turntable for receiving record disks, a central spindle projecting upward from the level of the turntable, and a tone arm pivotally mounted for movement toward and away from the spindle and movable between raised record-disengaging and lowered record-playing position; mechanism for raising and lowering said tone arm and for moving it inward toward the spindle and outward therefrom while raised, comprising a plate mounted for pivotal movement about an axis perpendicular to the plate, and movable in axial direction along the pivot axis; means operably connecting said plate to the tone arm for moving the latter about its pivot upon rotation of the plate and for raising and lowering the tone arm upon axial movement of the plate; a cam movable along said track, having an inclined surface for engaging the peripheral portion of said plate to raise the same and lift the tone arm upon inward movement of the cam in the radial portion of said track, and to lower said plate and tone arm upon outward movement therein, said cam having a top portion frictionally engaging the surface of the plate during inward and outward travel of the cam in the arcuate portion of the track to move said plate and tone arm respectively outward and inward about their pivots; and means for moving said cam inward and outward along both portions of said track during a record-changing operation.

10. In an automatic record changer having a horizontal turntable for reciving record disks, a central spindle projecting upward from the level of the turntable, and a tone arm pivotally mounted for movement toward and away from the spindle and movable between raised record-disengaging and lowered record-playing position; mechanism for raising and lowering said tone arm and for moving it inward toward the spindle and outward therefrom while raised, comprising a plate mounted for pivotal movement about an axis perpendicular to the plate, and movable in axial direction along the pivot axis; means operably connecting said plate to the tone arm for moving the latter about its pivot upon rotation of the plate and for raising and lowering the tone arm upon axial movement of the plate; a conical cam movable along said track having inclined sides which engage the peripheral portion of said plate to move the plate axially to raise the tone arm upon inward movement of the cam in the radial portion of said track and to lower the plate upon outward movement of the cam therein, the apex of said cam frictionally engaging the surface of said plate during travel of the cam in said arcuate portion of the track to move the plate and tone arm outward and inward about their pivots; a depression in the plate forming with said apex an impositive detent at a point in the arcuate travel of the cam to insure movement of the plate about its pivot together with said cam; and means for moving said cam inward and outward along both portions of said track during a record-changing operation.

11. In an automatic record changer having a horizontal turntable for receiving record disks, a central spindle projecting upward from the level of the turntable, and a tone arm pivotally mounted for movement toward and away from the spindle and movable between raised record-disengaging and lowered record-playing position; mechanism for raising and lowering said tone arm and for moving it inward toward the spindle and outward therefrom while raised, comprising a plate mounted for pivotal movement about an axis perpendicular to the plate, and movable in axial direction along the pivot axis; means operably connecting said plate to the tone arm for moving the latter about its pivot upon rotation of the plate and for raising and lowering the tone arm upon axial movement of the plate; cam means comprising a track having a portion extending radially from the plate and a communicating inner arcuate portion co-axial with the plate; a cam movable along said track, inward and outward movement of the cam in said radial portion of the track moving the plate in axial direction, respectively to raise and lower the tone arm, and movement of the cam along the arcuate portion of the track toward and away from said radial portion moving the plate in opposite directions about its axis to move the tone arm respectively outward and inward about its pivot; means for moving said cam inward and outward along both portions of said track during a record-changing operation; and index means becoming operative upon inward movement of said cam in the radial portion of its travel and moving to inoperative position on return movement of the cam in said radial portion of the track, said index means arresting said tone arm in pre-selected position during outward movement of the cam on said track.

12. In an automatic record changer having a horizontal turntable for receiving record disks, a central spindle projecting upward from the level of the turntable, and a tone arm pivotally mounted for movement toward and away from the spindle and movable between raised record-disengaging and lowered record-playing position; mechanism for raising and lowering said tone arm and for moving it inward toward the spindle and outward therefrom while raised, comprising a plate mounted for pivotal movement about an axis perpendicular to the plate, and movable in axial direction along the pivot axis; means operably connecting said plate to the tone arm for moving the latter about its pivot upon rotation of the plate and for raising and lowering the tone arm upon axial movement of the plate; cam means comprising a track having a portion extending radially from the plate and a communicating inner arcuate portion co-axial with the plate; a cam movable along said track means for moving said cam inward and outward along the radial and arcuate portions of said track during a record-changing operation; inward and outward movement of the cam in said radial portion of the track moving the plate in axial direction, respectively to raise and lower the tone arm, and movement of the cam along the arcuate portion of the track toward and away from said radial portion moving the plate in opposite directions about its axis to move the tone arm respectively outward and inward about its pivot; index means becoming operative upon inward movement of said cam in the radial portion of its travel and moving to inoperative position on return movement of the cam on said radial portion of the track, said index means having a normal index position for arresting said tone arm in shut-off position and an alternate index position for arresting the tone arm in a record-playing position during outward movement of the cam in the arcuate portion of the track; and means responsive to the weight of the record disk on said spindle for positioning said index means in said alternate position so as to adjust the tone arm in record-playing position when it is lowered to the turntable.

13. In an automatic record changer having a horizontal turntable for receiving record disks, a central spindle projecting upward from the level of the turntable, and a tone arm pivotally mounted for movement toward and away from the spindle and movable between raised record-disengaging and lowered record-playing position; mechanism for raising and lowering said tone arm and for moving it inward toward the spindle and outward therefrom while raised, comprising a plate mounted for pivotal movement about an axis perpendicular to the plate, and movable in axial direction along the pivot axis; means operably connecting said plate to the tone arm for moving the latter about its pivot upon rotation of the plate and for raising and lowering the tone arm upon axial movement of the plate; cam means comprising a track having a portion extending radially from the plate and a communicating inner arcuate portion co-axial with the plate; a cam movable along said track means for moving said cam inward and outward along the radial and arcuate portions of said track during a record-changing operation; inward and outward movement of the cam in said radial portion of the track moving the plate in axial direction, respectively to raise and lower the tone arm, and movement of the cam along the arcuate portion of the track toward and away from said radial portion moving the plate in opposite directions about its axis to move the tone arm respectively outward and inward about its pivot; index means becoming operative upon inward movement of said cam in the radial portion of its travel and moving to inoperative position on return movement of the cam in said radial portion of the track, said index means having a normal index position for arresting said tone arm in shut-off position and an alternate index position for arresting the tone arm in a record-playing position for a minimum standard size record; means responsive to the weight of a record disk on said spindle for positioning said index means in said alternate position so as to adjust the tone arm in record-playing position when the tone arm is lowered to the turntable; and index means rendered operative by movement of a large standard size record from said spindle to the turntable to arrest said tone arm in said playing position for said large size record, said index means becoming inoperative in response to lowering of the tone arm to record-playing position upon movement of the cam outward in the radial portion of the track.

14. In a phonograph having a horizontal turntable for receiving record disks, a spindle for supporting a stack of record disks above said turntable and for releasing said record disks one at a time to deposit the same upon said turntable, said spindle including: an axially movable operator; a plurality of arms; pivotal bearing means on said operator, engaging said arms and enabling the latter to swing outwardly to record-supporting position and inwardly to collapsed record-releasing position within the spindle; an exposed annulus of rubber-like material on said spindle adjacent and above said arms, said annulus being located for alignment with the record second from the bottom when a stack of records is supported by the arms; means to expand said annulus for gripping a record; and means for swinging the arms outwardly to support a stack of records in response to raising of the operator, said pivotal bearing means moving upwardly with said operator and said arms and enabling the uppermost portions of the arms to approach the horizontal plane containing the annulus whereby the distance a record moves in dropping from the annulus to said arm portions is decreased.

15. In a phonograph having a horizontal turntable for receiving record disks, a spindle for supporting a stack of records above said turntable and for releasing said records one at a time to deposit the same upon said turntable, said spindle including: an axially movable operator; means to raise said operator; a plurality of arms; pivotal bearing means on said operator, engaging said arms and enabling the latter to swing outwardly to record-supporting position and inwardly to collapsed record-releasing position within the spindle; an exposed annulus of rubber-like material on said spindle adjacent and above said arms; means to expand said annulus for gripping the record immediately above the lowermost record of a stack supported by said arms; and means moving the arms outwardly in response to raising of the operator, said bearing means moving upwardly with said operator and said arms and causing the uppermost portions of the arms to approach the horizontal plane containing the annulus whereby the distance a record moves in dropping from the annulus to said arm portions is decreased.

16. In a phonograph having a horizontal turntable for receiving record disks, a spindle for supporting a stack of record disks above said turntable and for releasing said record disks one at a time to deposit the same upon said turntable, said spindle including: an axially movable operator; a plurality of arms; pivotal bearing means on said operator, engaging said arms and enabling the latter to swing outwardly to record-supporting position and inwardly to collapsed record-releasing position within the spindle; an exposed annulus of rubber-like material on said spindle adjacent and above said arms; said annulus being located within the aperture of the second lowermost record of a stack supported by the arms; means to expand said annulus for gripping the peripheral surface of the aperture of a record and holding said second lowermost record of the stack; and means moving the operator and the arms which are carrying the lowermost record only downwardly to deposit the same on said turntable, said pivotal bearing means moving downwardly with said operator and said arms, thus causing the uppermost portions of the arms to approach the turntable whereby the distance the lowermost record carried by the arms moves in dropping to said turntable is decreased.

17. In a phonograph having a horizontal turntable for receiving records, a spindle for supporting a stack of records above said turntable and for releasing said records one at a time to deposit the same upon said turntable, said spindle including: an axially movable operator; a plurality of arms; pivotal bearing means on said operator, engaging said arms and enabling the latter to swing outwardly to record-supporting position and inwardly to collapsed record-releasing position within the spindle; an exposed annulus of rubber-like material located on said spindle for alignment with the peripheral surface of the aperture of the second lowermost record of a stack of records when supported by the arms; means for expanding said annulus to grip said peripheral surface of the aperture and hold said second lowermost record; means moving said arms downwardly in response to lowering of the operator, said pivotal bearing means moving downwardly with said operator and said arms, thus causing the uppermost portions of the arms to approach the turntable whereby the distance the record carried by the arms moves in dropping to said turntable is decreased; and means moving the arms outwardly in response to raising of the operator, said pivotal bearing means moving upwardly with said operator and said arms and causing the uppermost portions of the arms to approach the horizontal plane containing the annulus whereby the distance a record moves in dropping from the annulus to said arm portions is decreased.

GEORGE HAMLIN LEONARD.

REFERENCES CITED

The following references are of record in the file of this patent:

UNITED STATES PATENTS

| Number | Name | Date |
|---|---|---|
| 1,568,130 | Blackwell | Jan. 5, 1926 |
| 1,938,810 | Collison et al. | Dec. 12, 1933 |
| 1,991,005 | Whitman | Feb. 12, 1935 |
| 2,287,098 | Habegger | June 23, 1942 |
| 2,287,726 | Cranmer | June 23, 1942 |
| 2,295,092 | Offen | Sept. 8, 1942 |
| 2,298,988 | Todd | Oct. 13, 1942 |
| 2,307,030 | Erwood | Jan. 5, 1943 |
| 2,339,981 | Cranmer et al. | Jan. 25, 1944 |
| 2,355,790 | Faulkner | Aug. 15, 1944 |
| 2,371,362 | Small | Mar. 13, 1945 |
| 2,435,264 | Ansar | Feb. 3, 1948 |
| 2,457,106 | Pressley | Dec. 21, 1948 |

FOREIGN PATENTS

| Number | Country | Date |
|---|---|---|
| 822,026 | France | Sept. 6, 1937 |
| 55,603 | Netherlands | Oct. 16, 1943 |
| 62,822 | Denmark | Oct. 23, 1944 |
| 69,274 | Norway | May 28, 1945 |